US012192747B2

United States Patent
Da Silva et al.

(10) Patent No.: US 12,192,747 B2
(45) Date of Patent: Jan. 7, 2025

(54) CONDITIONAL MOBILITY TRIGGERING BASED ON BEAM INFORMATION

(71) Applicant: Telefonaktiebolaget LM Ericsson (publ), Stockholm (SE)

(72) Inventors: Icaro L. J. Da Silva, Solna (SE); Johan Rune, Lidingö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 494 days.

(21) Appl. No.: 17/425,024

(22) PCT Filed: Jan. 29, 2020

(86) PCT No.: PCT/IB2020/050691
§ 371 (c)(1),
(2) Date: Jul. 22, 2021

(87) PCT Pub. No.: WO2020/157670
PCT Pub. Date: Aug. 6, 2020

(65) Prior Publication Data
US 2022/0124590 A1     Apr. 21, 2022

Related U.S. Application Data

(60) Provisional application No. 62/798,563, filed on Jan. 30, 2019.

(51) Int. Cl.
*H04W 24/08* (2009.01)
*H04W 36/00* (2009.01)
*H04W 36/30* (2009.01)

(52) U.S. Cl.
CPC ....... *H04W 36/0058* (2018.08); *H04W 24/08* (2013.01); *H04W 36/302* (2023.05)

(58) Field of Classification Search
CPC ............... H04W 36/22; H04W 24/10; H04W 28/0284; H04W 36/32; H04W 36/00835;
(Continued)

(56) References Cited

U.S. PATENT DOCUMENTS

2016/0255671 A1* 9/2016 Rahman ............... H04W 24/08
 370/329
2017/0251460 A1* 8/2017 Agiwal ............... H04B 7/0617
(Continued)

FOREIGN PATENT DOCUMENTS

CN    104115419 A   10/2014
WO    2018083377 A1   5/2018
(Continued)

OTHER PUBLICATIONS

International Search Report and the Written Opinion of the International Searching Authority, issued in corresponding International Application No. PCT/IB2020/050691, dated Apr. 6, 2020, 26 pages.
(Continued)

*Primary Examiner* — Dady Chery
(74) *Attorney, Agent, or Firm* — Rothwell, Figg, Ernst & Manbeck, P.C.

(57) ABSTRACT

Methods performed by wireless devices and network nodes for conditional mobility procedures are disclosed. A method performed by a wireless device comprises receiving a conditional mobility configuration from a source network node containing at least a triggering condition for conditional mobility based on beam measurement information; and performing beam measurements for at least one beam of at least one cell, to obtain beam measurement information for the at least one beam. A method performed by a network node comprises defining a conditional mobility configuration containing at least a triggering condition for conditional mobility based on beam measurement information; and
(Continued)

initiating the transmission of the conditional mobility configuration to at least one user equipment. Also disclosed are base stations and wireless devices configured to perform the methods.

33 Claims, 15 Drawing Sheets

(58) Field of Classification Search
CPC . H04W 36/30; H04W 24/08; H04W 36/0058; H04W 36/0094; H04B 17/318; H04B 7/0695
See application file for complete search history.

(56) References Cited

U.S. PATENT DOCUMENTS

| | | |
|---|---|---|
| 2018/0359790 A1 | 12/2018 | Ingale et al. |
| 2021/0045031 A1* | 2/2021 | Lee ................. H04W 36/22 |

FOREIGN PATENT DOCUMENTS

| | | |
|---|---|---|
| WO | 2018083649 A1 | 5/2018 |
| WO | 2018156696 A1 | 8/2018 |
| WO | 2018175721 A1 | 9/2018 |
| WO | 2018175891 A1 | 9/2018 |
| WO | 2018203716 A1 | 11/2018 |

OTHER PUBLICATIONS

Spreadtrum Communications "Discussion on tendency of cell reselection to cells with more beams" 3GPP TSG-RAN WG2 Meeting #103, R2-1811404, Gothenburg, Sweden, Aug. 20-24, 2018, 2 pages.

InterDigital Communications "Conditional Reconfiguration for NR" 3GPP TSG-RAN WG2 Meeting #99bis, R2-1710669 (Resubmission of R2-1708736), Prague, Czech Republic, Oct. 9-13, 2017, 4 pages.

* cited by examiner

CONDITIONAL MOBILITY TRIGGERING BASED ON BEAM INFORMATION

CROSS REFERENCE TO RELATED APPLICATION(S)

This application is a 35 U.S.C. § 371 National Phase of PCT/IB2020/050691, filed Jan. 29, 2020, designating the United States, which claims the benefit of U.S. Provisional Application No. 62/798,563, filed Jan. 30, 2019, the disclosures of which are incorporated herein by this reference.

TECHNICAL FIELD

Embodiments of the present disclosure relate to methods and apparatus in networks, and particularly wireless devices, network nodes and methods in wireless devices and network nodes for conditional mobility procedures.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.
Mobility in RRC_CONNECTED in LTE and NR An RRC_CONNECTED UE in LTE (also called EUTRA) can be configured by the network to perform measurements and, upon triggering measurement reports, the network may send a handover command to the UE (in LTE an RRConnectionReconfiguration with a field called mobilityControlInfo and in NR an RRCReconfiguration with a reconfigurationWithSync field).

These reconfigurations are actually prepared by the target cell upon a request from the source node (over X2 interface in case of EUTRA-EPC or Xn interface in case of EUTRA-5GC or NR) and takes into account the existing RRC configuration the UE has with source cell (which are provided in the inter-node request). Among other parameters that reconfiguration provided by target contains all information the UE needs to access the target cell, e.g., random access configuration, a new C-RNTI assigned by the target cell and security parameters enabling the UE to calculate new security keys associated to the target cell so the UE can send a handover complete message on SRB1 (encrypted and integrity protected) based on new security keys upon accessing the target cell.

FIG. 1 summarizes the flow signalling between UE, source node and target node during a handover procedure.

Both in LTE and NR, some principles exist for handovers (or in more general terms, mobility in RRC_CONNECTED):

Mobility in RRC_CONNECTED is Network-based as the network has the best information regarding the current situation such as load conditions, resources in different nodes, available frequencies, etc. The network can also take into account the situation of many UEs in the network, for a resource allocation perspective.

Network prepares a target cell before the UE accesses that cell. Source provides UE with the RRC configuration to be used in the target cell, including SRB1 configuration to send HO complete.

UE is provided by target with a target C-RNTI, i.e., the target identifies UE from message 3 (see FIG. 1) on MAC level for the HO complete message. Hence, there is no context fetching, unless a failure occurs.

To speed up the handover, the network provides needed information on how to access the target, e.g., RACH configuration, so the UE does not have to acquire SI prior to the handover.

The UE may be provided with contention-free random access (CFRA) resources, i.e. in that case target identifies the UE from the preamble (message 1, see FIG. 1). The principle behind this is that the procedure can always be optimized with dedicated resources. In conditional handover (CHO) that might be a bit tricky as there is uncertainty about the final target but also the timing.

Security is prepared before the UE accesses the target cell, i.e., Keys must be refreshed before sending RRC Connection Reconfiguration Complete message, based on new keys and encrypted and integrity protected so UE can be verified in target cell.

Both full and delta reconfiguration are supported so that the HO command can be minimized.
Mobility Robustness Work Item in Rel-16 for LTE and NR and Conditional HO Two new work items for mobility enhancements in LTE and NR have started in 3GPP in release 16. The main objectives of the work items are to improve the robustness at handover and to decrease the interruption time at handover.

One problem related to robustness at handover is that the HO Command (RRCConnectionReconfiguration with mobilityControlInfo and RRCReconfiguration with a reconfigurationWithSync field) is normally sent when the radio conditions for the UE are already quite bad. That may lead to that the HO Command may not reach the UE in time if the message is segmented or there are retransmissions.

In LTE and NR, different approaches to increase mobility robustness have been discussed in the past. One approach discussed in NR is called "conditional handover" or "early handover command". In order to avoid the undesired dependence on the serving radio link upon the time (and radio conditions) where the UE should execute the handover, the possibility to provide RRC signaling for the handover to the UE earlier should be provided. To achieve this, it should be possible to associate the HO command with a condition, e.g., based on radio conditions possibly similar to the ones associated to an A3 event, where a given neighbour becomes X dB better than target. As soon as the condition is fulfilled, the UE executes the handover in accordance with the provided handover command.

Such a condition could, e.g., be that the quality of the target cell or beam becomes X dB stronger than the serving cell. The threshold Y used in a preceding measurement reporting event should then be chosen lower than the one in the handover execution condition. This allows the serving cell to prepare the handover upon reception of an early measurement report and to provide the RRCConnectionReconfiguration with mobilityControlInfo at a time when the radio link between the source cell and the UE is still stable. The execution of the handover is done at a later point in time (and threshold) which is considered optimal for the handover execution.

FIG. 2 depicts an example with just a serving and a target cell. In practice there may often be many cells or beams that the UE reported as possible candidates based on its preceding RRM measurements. The network should then have the freedom to issue conditional handover commands for several of those candidates. The RRCConnectionReconfiguration for each of those candidates may differ e.g. in terms of the HO execution condition (RS to measure and threshold to exceed) as well as in terms of the RA preamble to be sent when a condition is met.

While the UE evaluates the condition, it should continue operating per its current RRC configuration, i.e., without applying the conditional HO command. When the UE determines that the condition is fulfilled, it disconnects from the serving cell, applies the conditional HO command and connects to the target cell. These steps are equivalent to the current, instantaneous handover execution.

Resume Triggered by CHO

An alternative solution has been proposed relying on context fetching, called "conditional resume", where a condition is also provided to the UE and, upon the fulfillment of the condition the UE initiates a resume procedure (or a resume-like procedure) by transmitting an RRCResumeRequest (or similar) message in NR or an RRCConnectionResumeRequest (or similar) message in LTE. The proposal comprised a method executed by a UE in RRC connected mode the method comprising:

Receiving a message containing at least one condition from the network and monitoring the fulfillment of the provided condition;

Upon the fulfillment of a condition triggering a resume procedure or an equivalent procedure towards at least one target cell comprising:

In general terms, both conditional handover and conditional resume may be considered as conditional mobility procedure.

NR Measurements in More Detail

The Synchronization Signal and PBCH block (SSB) consists of primary and secondary synchronization signals (PSS and SSS, respectively), each occupying 1 symbol and 127 subcarriers, and PBCH spanning across 3 OFDM symbols and 240 subcarriers, but on one symbol leaving an unused part in the middle for SSS as show in FIG. 3 ((which appears as figure 5.2.4-1 in 3GPP TS 38.300). The periodicity of the SSB can be configured by the network and the time locations where SSB can be sent are determined by sub-carrier spacing.

Within the frequency span of a carrier, multiple SSBs can be transmitted. The Pas of those SSBs do not have to be unique, i.e., different SSBs can have different PCIs. However, when an SSB is associated with an RMSI, the SSB corresponds to an individual cell, which has a unique NR Cell Global Identifier (NCGI; see subclause 8.2). Such an SSB is referred to as a Cell-Defining SSB (CD-SSB). A PCell is always associated to a CD-SSB located on the synchronization raster.

In RRC_CONNECTED, the UE measures multiple beams (at least one) of a cell and the measurements result (power values) are averaged to derive the cell quality. In doing so, the UE is configured to consider a subset of the detected beams. Filtering takes place at two different levels: at the physical layer to derive beam quality and then at RRC level to derive cell quality from multiple beams. Cell quality from beam measurements is derived in the same way for the serving cell(s) and for the non-serving cell(s). Measurement reports may contain the measurement results of the X best beams if the UE is configured to do so by the gNB.

The corresponding high-level measurement model is described below and shown in FIG. 4 (which appears as figure 9.2.4-1 in 3GPP TS 38.300):

NOTE: K beams correspond to the measurements on SSB or CSI-RS resources configured for L3 mobility by gNB and detected by UE at L1.

A: measurements (beam specific samples) internal to the physical layer.

Layer 1 filtering: internal layer 1 filtering of the inputs measured at point A. Exact filtering is implementation dependent. How the measurements are actually executed in the physical layer by an implementation (inputs A and Layer 1 filtering) in not constrained by the standard.

$A^1$: measurements (i.e., beam specific measurements) reported by layer 1 to layer 3 after layer 1 filtering.

Beam Consolidation/Selection: beam specific measurements are consolidated to derive cell quality. The behavior of the Beam consolidation/selection is standardized and the configuration of this module is provided by RRC signaling. Reporting period at B equals one measurement period at $A^1$.

B: a measurement (i.e. cell quality) derived from beam-specific measurements reported to layer 3 after beam consolidation/selection.

Layer 3 filtering for cell quality: filtering performed on the measurements provided at point B. The behaviour of the Layer 3 filters is standardised and the configuration of the layer 3 filters is provided by RRC signalling. Filtering reporting period at C equals one measurement period at B.

C: a measurement after processing in the layer 3 filter. The reporting rate is identical to the reporting rate at point B. This measurement is used as input for one or more evaluation of reporting criteria.

Evaluation of reporting criteria: checks whether actual measurement reporting is necessary at point D. The evaluation can be based on more than one flow of measurements at reference point C, e.g., to compare between different measurements. This is illustrated by input C and $C^1$. The UE shall evaluate the reporting criteria at least every time a new measurement result is reported at point C, $C^1$. The reporting criteria are standardized and the configuration is provided by RRC signaling (UE measurements).

D: measurement report information (message) sent on the radio interface.

L3 Beam filtering: filtering performed on the measurements (i.e. beam specific measurements) provided at point $A^1$. The behavior of the beam filters is standardized and the configuration of the beam filters is provided by RRC signaling. Filtering reporting period at E equals one measurement period at $A^1$.

E: a measurement (i.e. beam-specific measurement) after processing in the beam filter. The reporting rate is identical to the reporting rate at point $A^1$. This measurement is used as input for selecting the X measurements to be reported.

Beam Selection for beam reporting: selects the X measurements from the measurements provided at point E.

The behavior of the beam selection is standardized and the configuration of this module is provided by RRC signaling.

F: beam measurement information included in measurement report (sent) on the radio interface.

Layer 1 filtering introduces a certain level of measurement averaging. How and when the UE exactly performs the required measurements is implementation specific to the point that the output at B fulfils the performance requirements set in 3GPP TS 38.133. Layer 3 filtering for cell quality and related parameters used are specified in 3GPP TS 38.331 and do not introduce any delay in the sample availability between B and C. Measurement at point C, $C^1$ is the input used in the event evaluation. L3 Beam filtering and related parameters used are specified in 3GPP TS 38.331 and do not introduce any delay in the sample availability between E and F.

Beam Information in NR Measurement Reports

In NR RRC (as discussed in TS 38.331), the structure of the measurement reports when it comes to beam information is divided per reported cell and RS type. For each cell, UE may include SSB indexes of good beams, and possibly associated measurements, depending on the fulfilment of conditions defined in the specifications. Similarly, UE may also report CSI-RS indexes and possibly associated measurements.

The IE MeasResults covers measured results for intra-frequency, inter-frequency, and inter-RAT mobility (see in particular: MeasResultListNR; rsIndexResults; MeasQuantityResults; ResultsPerSSB-Index; and ResultsPerCSI-RS-Index)

MeasResults information element

```
-- ASN1START
-- TAG-MEAS-RESULTS-START
MeasResults ::=                          SEQUENCE {
    measId                               MeasId,
    measResultServingMOList              MeasResultServMOList,
    measResultNeighCells                 CHOICE {
        measResultListNR                     MeasResultListNR,
        ...,
        measResultListEUTRA                  MeasResultListEUTRA
    }
OPTIONAL,
    ...
}
MeasResultServMOList ::=                 SEQUENCE (SIZE
(1..maxNrofServingCells)) OF MeasResultServMO
MeasResultServMO ::=                     SEQUENCE {
    servCellId                           ServCellIndex,
    measResultServingCell                MeasResultNR,
    measResultBestNeighCell              MeasResultNR
OPTIONAL,
    ...
}
MeasResultListNR ::=                     SEQUENCE (SIZE (1..maxCellReport)) OF
MeasResultNR
MeasResultNR ::=                         SEQUENCE {
    physCellId                           PhysCellId
OPTIONAL,
    measResult                           SEQUENCE {
        cellResults                          SEQUENCE{
            resultsSSB-Cell                      MeasQuantityResults
OPTIONAL,
            resultsCSI-RS-Cell                   MeasQuantityResults
OPTIONAL
        },
        rsIndexResults                       SEQUENCE{
            resultsSSB-Indexes                   ResultsPerSSB-IndexList
OPTIONAL,
            resultsCSI-RS-Indexes                ResultsPerCSI-RS-
IndexList                                       OPTIONAL
        }
OPTIONAL
    },
    ...,
    [[
    cgi-Info                             CGI-Info
OPTIONAL
    ]]
}
MeasResultListEUTRA ::=                  SEQUENCE (SIZE (1..maxCellReport)) OF
MeasResultEUTRA
MeasResultEUTRA ::=                      SEQUENCE {
    eutra-PhysCellId                     PhysCellId,
    measResult                           MeasQuantityResultsEUTRA,
    cgi-Info                             SEQUENCE {
        cgi-info-EPC                         SEQUENCE {
            cgi-info-EPC-legacy                  CellAccessRelatedInfo-
EUTRA-EPC,
            cgi-info-EPC-list                    SEQUENCE (SIZE
```

MeasResults information element (continued)

```
(1..maxPLMN)) OF CellAccessRelatedInfo-EUTRA-EPC    OPTIONAL
   } OPTIONAL,
   cgi-info-5GC                     SEQUENCE (SIZE (1..maxPLMN))
OF CellAccessRelatedInfo-EUTRA-5GC    OPTIONAL,
      freqBandIndicator              FreqBandIndicatorEUTRA,
      multiBandInfoList              MultiBandInfoListEUTRA
OPTIONAL,
      freqBandIndicatorPriority      ENUMERATED (true)
OPTIONAL
   }
OPTIONAL,
   ...
}
MultiBandInfoListEUTRA ::=          SEQUENCE (SIZE (1..maxMultiBands)) OF
FreqBandIndicatorEUTRA
MeasQuantityResults ::=             SEQUENCE {
   rsrp                              RSRP-Range
OPTIONAL,
   rsrq                              RSRQ-Range
OPTIONAL,
   sinr                              SINR-Range
OPTIONAL
}
MeasQuantityResultsEUTRA ::=        SEQUENCE {
   rsrp                              RSRP-RangeEUTRA
OPTIONAL,
   rsrq                              RSRQ-RangeEUTRA
OPTIONAL,
   sinr                              SINR-RangeEUTRA
OPTIONAL
}
ResultsPerSSB-IndexList::=          SEQUENCE (SIZE
(1..maxNrofIndexesToReport2)) OF ResultsPerSSB-Index
ResultsPerSSB-Index ::=             SEQUENCE {
   ssb-Index                         SSB-Index,
   ssb-Results                       MeasQuantityResults
OPTIONAL
}
ResultsPerCSI-RS-IndexList::=       SEQUENCE (SIZE
(1..maxNrofIndexesToReport2)) OF ResultsPerCSI-RS-Index
ResultsPerCSI-RS-Index              SEQUENCE {
   csi-RS-Index                      CSI-RS-Index,
   csi-RS-Results                    MeasQuantityResults
OPTIONAL
}
-- TAG-MEAS-RESULTS-STOP
-- ASN1STOP
```

Criteria to Include Beam Measurement Information

The reporting of beam measurements is something that depends on parameters in reportConfig associated to a given measId and measObject. It is also important to say that the term BEAM is not often used in RRC, but rather the term RS index, as the beamformed RS index is considered as the beam.

The parameters that are related to beam information reporting and their definition in RRC are, as shown in the ReportConfigNR IE reproduced below: reportQuantityRs-Indexes; maxNrofRSIndexesToReport; and includeBeam-Measurements.

The IE ReportConfigNR specifies criteria for triggering of an NR measurement reporting event. Measurement reporting events are based on cell measurement results, which can either be derived based on SS/PBCH block or CSI-RS. These events are labelled AN with N equal to 1, 2 and so on.

Event A1: Serving becomes better than absolute threshold;

Event A2: Serving becomes worse than absolute threshold;

Event A3: Neighbour becomes amount of offset better than PCell/PSCell;

Event A4: Neighbour becomes better than absolute threshold;

Event A5: PCell/PSCell becomes worse than absolute threshold1 AND Neighbour/SCell becomes better than another absolute threshold2.

Event A6: Neighbour becomes amount of offset better than SCell.

ReportConfigNR information element

```
-- ASN1START
-- TAG-REPORT-CONFIG-START
ReportConfigNR ::=                  SEQUENCE {
   reportType                        CHOICE {
      periodical                     PeriodicalReportConfig,
      eventTriggered                 EventTriggerConfig,
      ...,
      reportCGI                      ReportCGI
   }
}
ReportCGI ::=                       SEQUENCE {
   cellForWhichToReportCGI           PhysCellId,
   ...
}
EventTriggerConfig::=               SEQUENCE {
```

-continued

| ReportConfigNR information element | |
|---|---|
| eventId | CHOICE { |
| eventA1 | SEQUENCE { |
| a1-Threshold | MeasTriggerQuantity, |
| reportOnLeave | BOOLEAN, |
| hysteresis | Hysteresis, |
| timeToTrigger | TimeToTrigger |
| }, | |
| eventA2 | SEQUENCE { |
| a2-Threshold | MeasTriggerQuantity, |
| reportOnLeave | BOOLEAN, |
| hysteresis | Hysteresis, |
| timeToTrigger | TimeToTrigger |
| }, | |
| eventA3 | SEQUENCE { |
| a3-Offset MeasTriggerQuantityOffset, | |
| reportOnLeave | BOOLEAN, |
| hysteresis | Hysteresis, |
| timeToTrigger | TimeToTrigger, |
| useWhiteCellList | BOOLEAN |
| }, | |
| eventA4 | SEQUENCE { |
| a4-Threshold | MeasTriggerQuantity, |
| reportOnLeave | BOOLEAN, |
| hysteresis | Hysteresis, |
| timeToTrigger | TimeToTrigger, |
| useWhiteCellList | BOOLEAN |
| }, | |
| eventA5 | SEQUENCE { |
| a5-Threshold1 | MeasTriggerQuantity, |
| a5-Threshold2 | MeasTriggerQuantity, |
| reportOnLeave | BOOLEAN, |
| hysteresis | Hysteresis, |
| timeToTrigger | TimeToTrigger, |
| useWhiteCellList | BOOLEAN |
| }, | |
| eventA6 | SEQUENCE { |
| a6-Offset MeasTriggerQuantityOffset, | |
| reportOnLeave | BOOLEAN, |
| hysteresis | Hysteresis, |
| timeToTrigger | TimeToTrigger, |
| useWhiteCellList | BOOLEAN |
| }, | |
| ... | |
| }, | |
| rsType | NR-RS-Type, |
| reportInterval | ReportInterval, |
| reportAmount | ENUMERATED {r1, r2, r4, r8, r16, r32, r64, infinity}, |
| reportQuantityCell | MeasReportQuantity, |
| maxReportCells | INTEGER (1..maxCellReport), |
| reportQuantityRsIndexes OPTIONAL, -- Need R | MeasReportQuantity |
| maxNrofRSIndexesToReport (1..maxNrofIndexesToReport) R | INTEGER OPTIONAL, -- Need |
| includeBeamMeasurements | BOOLEAN, |
| reportAddNeighMeas OPTIONAL, -- Need R | ENUMERATED {setup} |
| ... | |
| } | |
| PeriodicalReportConfig | SEQUENCE { |
| rsType | NR-RS-Type, |
| reportInterval | ReportInterval, |
| reportAmount | ENUMERATED (r1, r2, r4, r8, r16, r32, r64, infinity), |
| reportQuantityCell | MeasReportQuantity, |
| maxReportCells | INTEGER (1..maxCellReport), |
| reportQuantityRsIndexes OPTIONAL, -- Need R | MeasReportQuantity |
| maxNrofRsIndexesToReport (1..maxNrofIndexesToReport) R | INTEGER OPTIONAL, -- Need |
| includeBeamMeasurements | BOOLEAN, |
| useWhiteCellList | BOOLEAN, |
| ... | |

-continued

| ReportConfigNR information element | |
|---|---|
| } | |
| NR-RS-Type ::= | ENUMERATED {ssb, csi-rs} |
| MeasTriggerQuantity ::= | CHOICE { |
| rsrp | RSRP-Range, |
| rsrq | RSRQ-Range, |
| sinr | SINR-Range |
| } | |
| MeasTriggerQuantityOffset ::= | CHOICE { |
| rsrp | INTEGER (−30..30), |
| rsrq | INTEGER (−30..30), |
| sinr | INTEGER (−30..30) |
| } | |
| MeasReportQuantity ::= | SEQUENCE { |
| rsrp | BOOLEAN, |
| rsrq | BOOLEAN, |
| sinr | BOOLEAN |
| } | |
| -- TAG-REPORT-CONFIG-START | |
| -- ASN1STOP | |

| maxNrofRsIndexesToReport |
|---|
| Max number of RS indexes per cell to include in the measurement report for A1-A6 events. |
| reportQuantityRsIndexes |
| Indicates which measurement information per RS index the UE shall include in the measurement report. |

Not all beams are always included in measurements reports, but only the best beam and remaining good beams up to a maximum value i.e. the ones above a defined threshold. The exact formulation of the criteria is defined in RRC in section 5.5.5.2 of TS 38.331 as:

3> include within resultsSSB-Indexes the index associated to the best beam for that SS/PBCH block sorting quantity and if absThreshSS-BlocksConsolidation is included in the VarMeasConfig for the measObject associated to the cell for which beams are to be reported, the remaining beams whose sorting quantity is above absThreshSS-BlocksConsolidation;

3> if includeBeamMeasurements is configured, include the SS/PBCH based measurement results for the quantities in reportQuantityRsIndexes set to TRUE for each SS/PBCH blockindex;

3> include within resultsCSI-RS-Indexes the index associated to the best beam for that CSI-RS sorting quantity and, if absThreshCSI-RS-Consolidation is included in the VarMeasConfig for the measObject associated to the cell for which beams are to be reported, the remaining beams whose sorting quantity is above absThreshCSI-RS-Consolidation;

3> if includeBeamMeasurements is configured, include the CSI-RS based measurement results for the quantities in reportQuantityRsIndexes set to TRUE for each CSI-RS index.

The context in section 5.5.5.2 is shown below:

5.5.5.2 Reporting of Beam Measurement Information

For beam measurement information to be included in a measurement report the UE shall:

1> if reportType is set to eventTriggered:

2> consider the trigger quantity as the sorting quantity;

1> if reportType is set to periodical:

2> if a single reporting quantity is set to TRUE in reportQuantityRsIndexes;

3> consider the configured single quantity as the sorting quantity;
2> else:
3> if rsrp is set to TRUE;
4> consider RSRP as the sorting quantity;
3> else:
4> consider RSRQ as the sorting quantity;
1> set rsIndexResults to include up to maxNrofRsIndexesToReport SS/PBCH block indexes or CSI-RS indexes in order of decreasing sorting quantity as follows:
2> if the measurement information to be included is based on SS/PBCH block:
3> include within resultsSSB-Indexes the index associated to the best beam for that SS/PBCH block sorting quantity and if absThreshSS-Blocks-Consolidation is included in the VarMeasConfig for the measObject associated to the cell for which beams are to be reported, the remaining beams whose sorting quantity is above absThreshSS-BlocksConsolidation;
3> if includeBeamMeasurements is configured, include the SS/PBCH based measurement results for the quantities in reportQuantityRsIndexes set to TRUE for each SS/PBCH blockindex;
2> else if the beam measurement information to be included is based on CSI-RS:
3> include within resultsCSI-RS-Indexes the index associated to the best beam for that CSI-RS sorting quantity and, if absThreshCSI-RS-Consolidation is included in the VarMeasConfig for the measObject associated to the cell for which beams are to be reported, the remaining beams whose sorting quantity is above absThreshCSI-RS-Consolidation;
3> if includeBeamMeasurements is configured, include the CSI-RS based measurement results for the quantities in reportQuantityRsIndexes set to TRUE for each CSI-RS index.

There currently exist certain challenges. In LTE and NR, handover decisions or PSCell change decisions (when the UE is operating in E-UTRA-NR Dual Connectivity (EN-DC) and/or Multi-radio access technology (MR-DC) or any other form of dual connectivity, carrier aggregation, etc.) are typically taken based on the coverage and quality of a serving cell compared to the quality of a potential neighbor. Quality is typically measured in terms of RSRQ or SINR, while coverage is typically measured based on RSRP. In NR, a cell may be comprised by a set of beams where PSS/SSS are transmitted in different downlink beams, as illustrated schematically in FIG. 5.

As described above, beam measurement information (SSB/CSI-RS indexes with or without associated measurements) may be included in measurement reports for each cell triggering measurement report. One of the purposes of these beam reports is to enable the source node to take educated mobility decisions in terms of ping-pong avoidance. For example, if multiple neighbor cells are reported (e.g. in an A3 event) and these cells have somewhat equivalent quality/coverage (e.g. similar RSRP and/or similar RSRQ and/or similar RSRQ), criteria to decide where to handover the UE to could be the quality of reported beams. For example, network could prioritize the cells with more beams than another cell. A schematic diagram of a source cell and target cell is shown in FIG. 6.

Triggering conditions for conditional handover (or any other form of conditional mobility such as conditional resume or conditional reestablishment) have been briefly discussed and most of the discussions assume that triggering conditions would be based on A1-A6 events, i.e., cell level measurement quantities such as cell-based RSRP and/or cell-based RSRQ and/or cell-based SINR.

However, as source node may want to take mobility decisions also based on reported beam measurements, it would not be possible to take decisions based on beam information, i.e., while mobility robustness aims to be improved with conditional handover, the fact that beam information is not taken into account may not solve the problem as the UE may handover to a cell with very good quality but only with one stable good beam, i.e., after handing over the UE may either be handed over to another cell, the source cell again or even experience radio link failure. Or, that may lead to more frequent ping-pongs compared to an ordinary handover that may rely on beam measurement information reporting.

[1] TS 38.300 v 15.4.0 considers the requirements for support of Radio Resource Management for the FDD and TDD modes of New Radio (NR).
[2] TS 38.331 v 15.4.0 considers the Radio Resource Control protocol for the radio interface between UE and NG-RAN.
[3] TS 38.133 v 15.4.0 considers the requirements for support of Radio Resource Management for the FDD and TDD modes of New Radio (NR).

SUMMARY

It is an object of the present disclosure reduce instances of radio link failure and ping-ponging, thereby improving the stability of handover procedures and reducing the load on wireless device power sources that may be caused by repeated handover procedures or connection reestablishment procedures.

Embodiments of the disclosure aim to provide apparatus and methods that alleviate some or all of the issues identified.

An aspect of an embodiment of the disclosure provides a method at a UE for triggering a conditional mobility procedure, the method comprising: receiving a conditional mobility configuration from a source network node containing at least a triggering condition for conditional mobility based on beam measurement information; and performing beam measurements for at least one beam of at least one cell, to obtain beam measurement information for the at least one beam.

A further aspect of an embodiment of the disclosure provides a method at a UE for triggering a conditional handover procedure, the method comprising: receiving a conditional handover configuration from a source network node containing at least a triggering condition for conditional handover based on beam measurement information; performing beam measurements for at least one beam of each of a plurality of cells, to obtain beam measurement information for beams, wherein the beam measurement information comprises a number of beams that satisfy a predetermined condition; and where beams of a plurality of cells satisfy the predetermined condition, selecting one of the plurality of cells for the conditional handover procedure.

A still further aspect of an embodiment provides a method at a network node for facilitating a conditional mobility procedure, the method comprising: defining a conditional mobility configuration containing at least a triggering condition for conditional mobility based on beam measurement information; and initiating the transmission of the conditional mobility configuration to at least one user equipment.

Other aspects of embodiments provide UEs and network nodes configured to execute the methods described herein.

BRIEF DESCRIPTION OF DRAWINGS

For a better understanding of the present disclosure, and to show how it may be put into effect, reference will now be made, by way of example only, to the accompanying drawings, in which.

DETAILED DESCRIPTION

Figure 1:
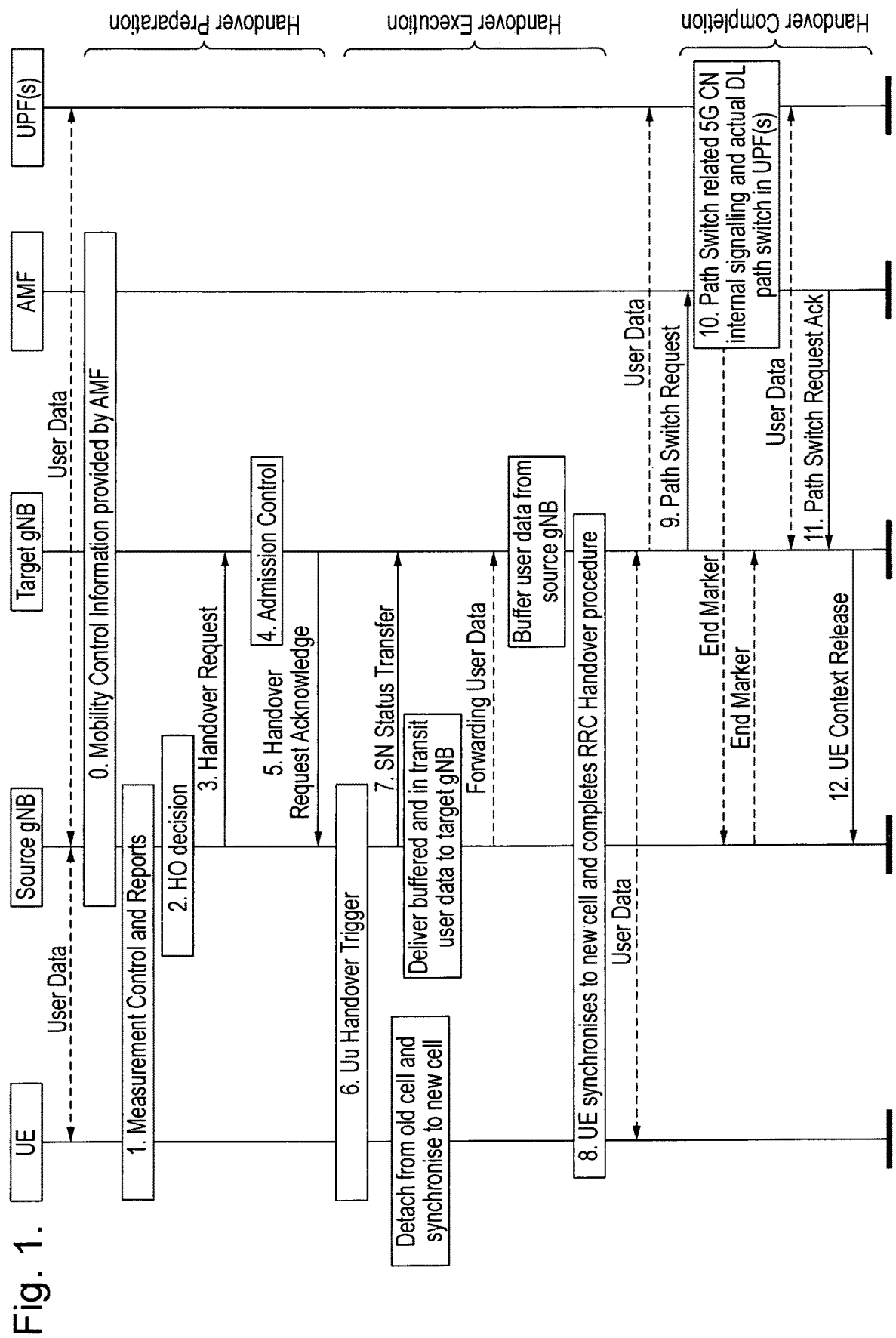
FIG. 1 is a signalling diagram summarising the flow signalling between UE, source node and target node during a handover procedure.
Figure 2:
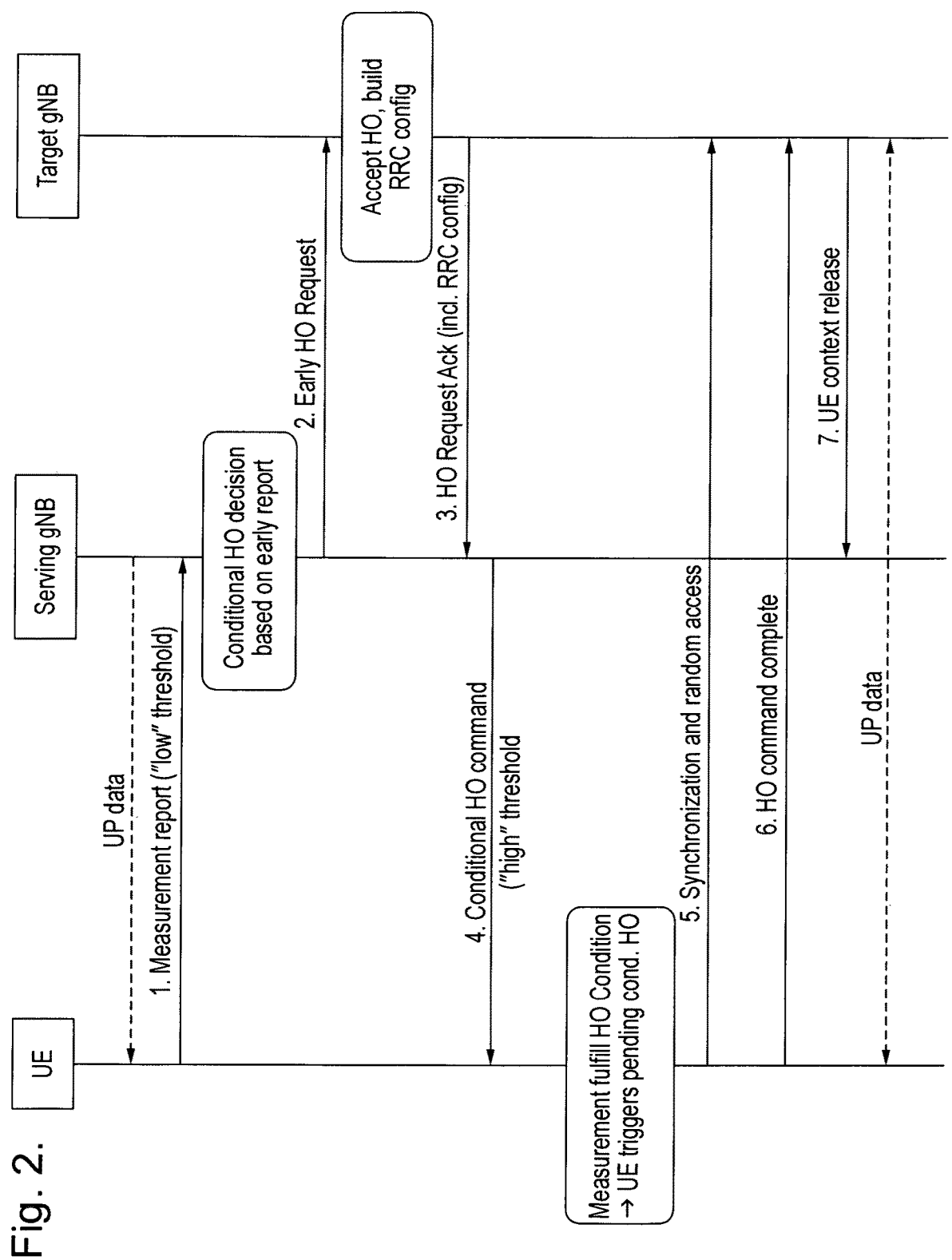
FIG. 2 is a signalling diagram of a conditional handover execution.
Figure 3:
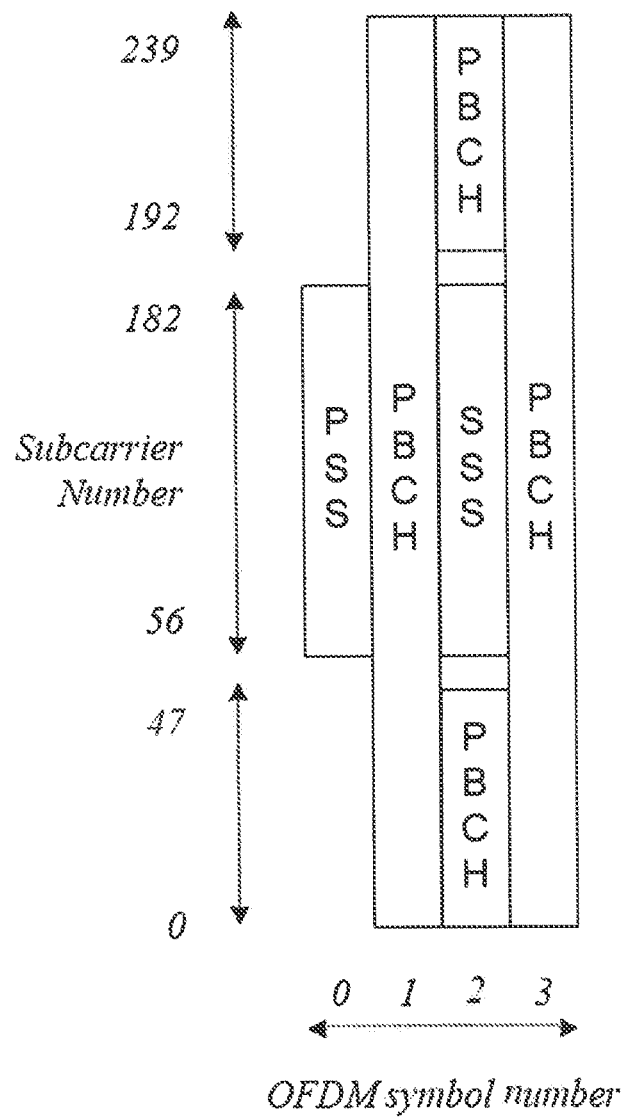
FIG. 3 is a diagram of the time-frequency structure of a Synchronization Signal and PBCH block (SSB)
Figure 4:
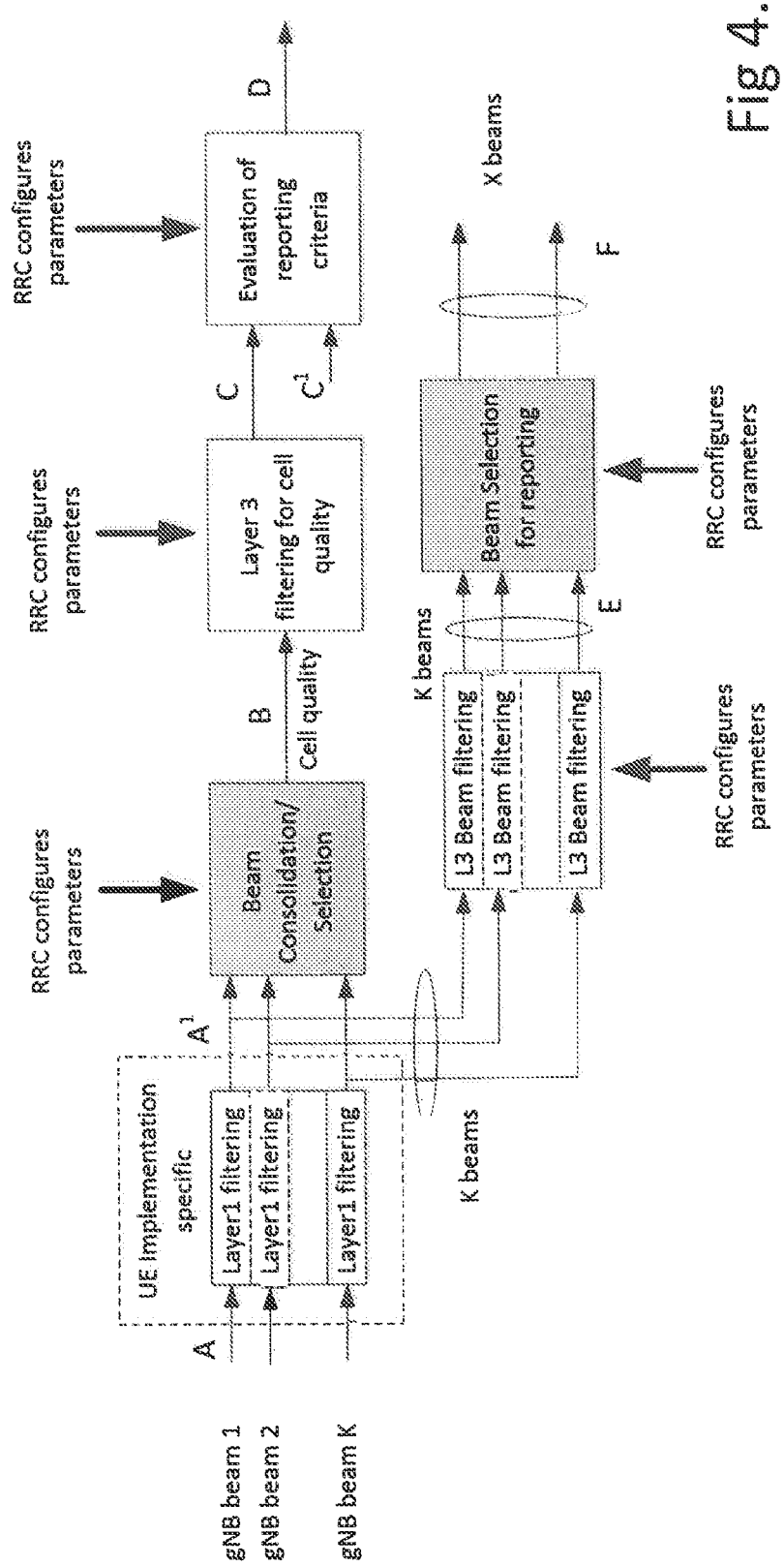
FIG. 4 is a schematic diagram of a measurement model.
Figure 5:
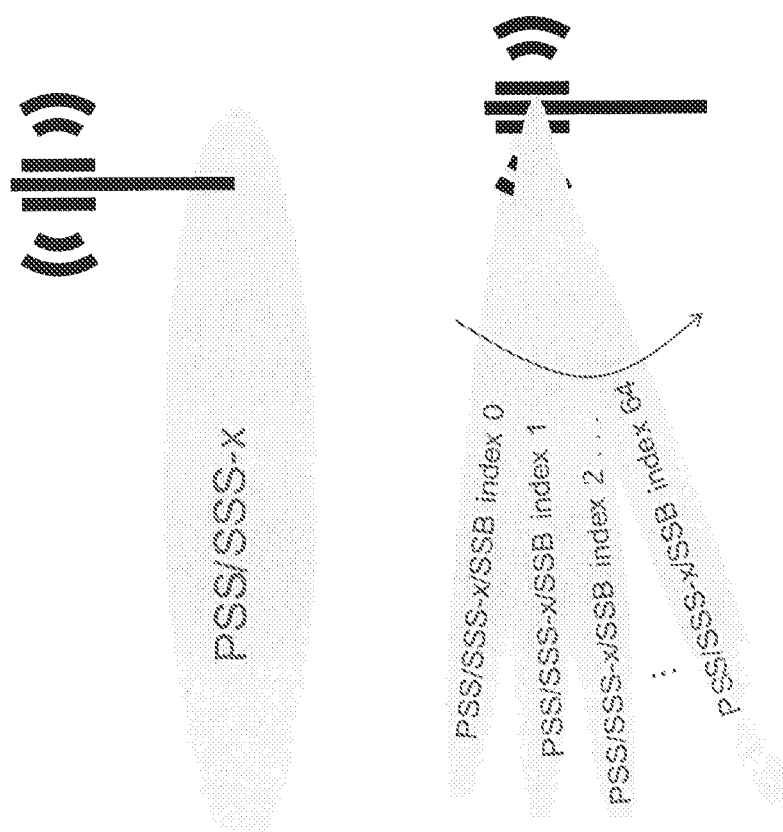
FIG. 5 is a schematic diagram of a cell comprised by a set of beams.
Figure 6:
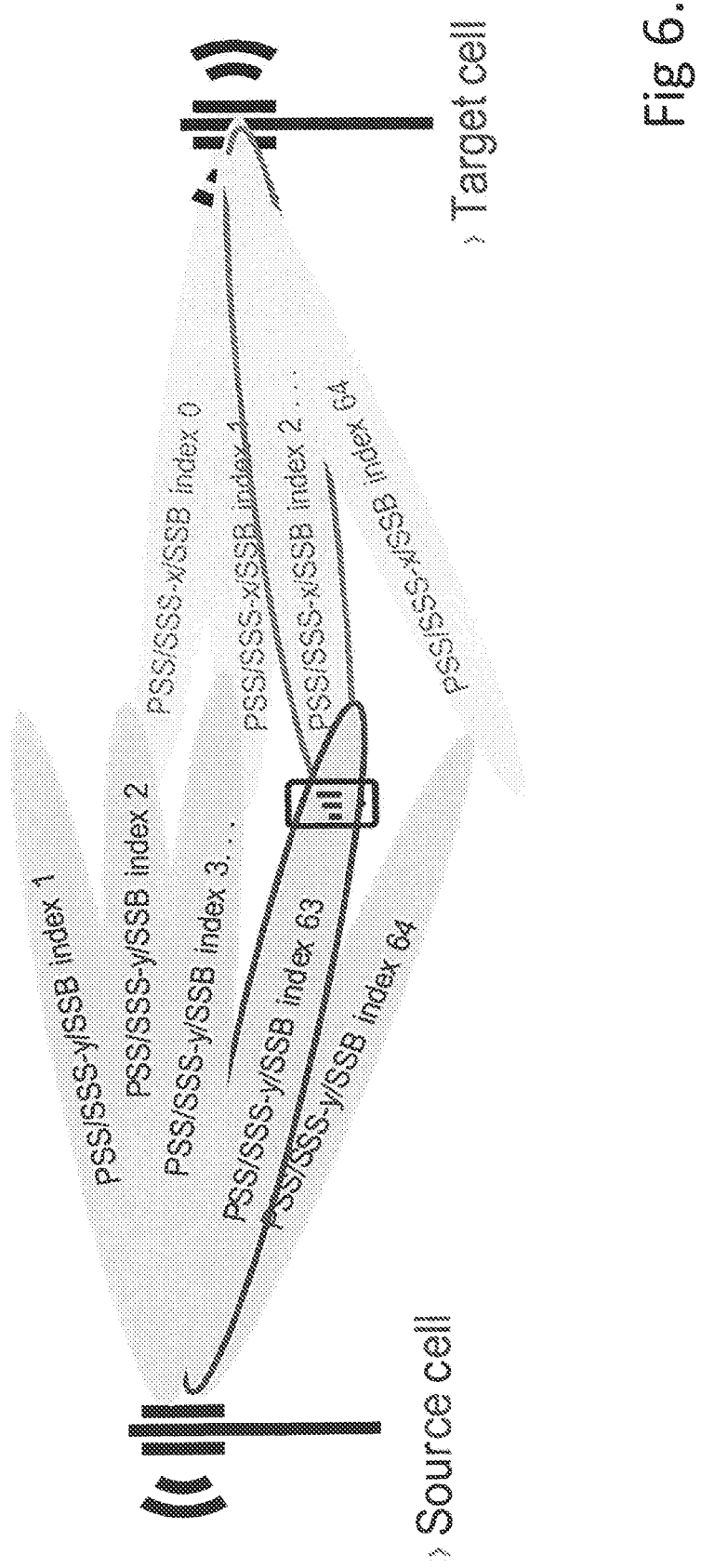
FIG. 6 is a schematic diagram of a source cell and a target cell.

Certain aspects of the present disclosure and their embodiments may provide solutions to these or other challenges. According to certain embodiments, the proposed solutions use beam measurement information as input to triggering criteria for conditional mobility for UEs, such as conditional handover. In addition, beam measurement information is used as input to a sorting rule to sort cells to assist the UE to select a cell to execute CHO in case multiple cells fulfill the triggering condition for CHO.

There are, proposed herein, various embodiments which address one or more of the issues disclosed herein. According to certain embodiments, a method is disclosed at the UE for triggering a conditional mobility procedure. The method comprises receiving a conditional mobility configuration from a source network node containing at least a triggering condition for conditional mobility based on beam measurement information. Upon the reception, the UE starts the monitoring of triggering conditions based on beam measurement information, i.e., performing beam measurements.

The method also comprises, in addition to the triggering of a conditional handover condition based on beam-related information, the following:

Selection criterion based on beam-related information in case multiple cells fulfill the CHO triggering condition and the UE needs to select one to execute the CHO;

A sorting rule based on beam-related information in case multiple cells fulfill the CHO triggering condition and the UE needs to sort the cells in a particular order, so that the UE execute the CHO in the cell with highest rank or on top, after sorting;

Conditional mobility in the context of the disclosure may be, for example, one of the following, or any combination of these:

Conditional handover;
Conditional resume;
Conditional re-establishment:

The exact conditional mobility configuration depends on the exact variant of the method being used, in addition to the configuration of the triggering condition to be monitored. For example, if conditional handover is used as the conditional mobility function, that comprises the content of an RRCReconfiguration-like message prepared by a target candidate (including a reconfigurationWithSync). For example, for conditional resume or reestablishment that comprises a resume identifier like an I-RNTI (e.g. full or short), a resume identity, a source C-RNTI and source PCI, etc.

The exact beam measurement information may comprise:
Exact beam indexes:
SSB indexes and/or
CSI-RS indexes and/or
Any index associated to an RS type that may be beamformed and may indicate a beam.
Beam measurements:
SSB RSRP and/or SSB RSRQ and/or SSB SINR
CSI-RS RSRP and/or CSI-RS RSRQ and/or CSI-RS SINR
These may be associated to each index
These may be filtered (According to L3 parameters also provided as part of a configuration), unfiltered or filtered according to UE implementation (i.e., not specified).
Number of beams fulfilling a condition, such as:
Number of SSBs whose RSRP is above a threshold X1
Number of SSBs whose RSRQ is above a threshold X2
Number of SSBs whose SINR is above a threshold X3
Number of CSI-RSs whose RSRP is above a threshold Y1
Number of CSI-RS whose RSRQ is above a threshold Y2
Number of CSI-RSs whose SINR is above a threshold Y3
Any combination of the previous conditions.

According to certain embodiments, a UE is disclosed that is configured for triggering a conditional mobility procedure. The UE comprises suitable hardware (e.g., processing circuitry) configured to perform the various method steps discussed above.

According to certain embodiments, a method is disclosed at a network node. The method comprises sending a conditional mobility configuration to a UE, the configuration containing at least a triggering condition for conditional mobility based on beam measurement information. Upon the reception, the UE starts the monitoring of triggering conditions based on beam measurement information, i.e., performing beam measurements.

According to certain embodiments, a network node is disclosed. The network node comprises suitable hardware (e.g., processing circuitry) configured to perform the various method steps discussed above.

Certain embodiments may provide one or more of the following technical advantages. Thanks to the proposed method, the network may configure the UE to perform as a network-based algorithm would perform when it comes to take into account beam measurement information to trigger conditional mobility decisions. Based on that, it is possible to reduce the amount of ping-pong handovers or failures caused by handovers to cells with a low number of good beams, which are a potential source of signalling and failures. Then, less signalling is used, and consequently less UE battery power. These and other advantages will be readily apparent in light of the remaining disclosure.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the Conditional Mobility Throughout this disclosure, the term "conditional mobility" has been used to refer to conditional handover, conditional resume, conditional reconfiguration with sync, conditional reconfiguration, conditional reestablishment, etc. The term should be interpreted fundamentally as any procedure that is configured by network to the UE which contains a condition (e.g., associated to one or multiple measurement event) and, upon the fulfillment of that condition the UE shall perform the mobility related procedure (e.g., resume, handover, reconfiguration with sync, beam switching, etc.).

The method applies for a conditional mobility configuration associated to a single cell or to multiple cells. In the case of single cell, a single measurement configuration reference may be provided and linked to a mobility procedure. In the case of multiple cells, a single measurement configuration reference may be provided and linked to the monitoring of multiple cells, e.g., within the same measurement object/frequency. Or alternatively, multiple measurement configuration references may be provided and referred to different cells.

Conditional Mobility Configuration

The various embodiments describe the term "conditional mobility configuration". In the context of the disclosure, that may be interpreted as the RRCReconfiguration in NR terminology (or RRCConnectionReconfiguration if LTE terminology) prepared by a potential target cell that the UE applies and perform actions upon when the configured condition for the conditional mobility procedure is triggered. In the disclosure, the statement that multiple trigger quantities are introduced for the condition triggering conditional mobility means that the UE monitors the fulfilment of conditions associated to multiple conditions (e.g., RSRP above a threshold AND RSRQ above a threshold), only when both are fulfilled the UE applies the RRCReconfiguration and perform actions upon.

The same is valid for conditional mobility based on resume or reestablishment. When the condition based on beam measurement information is fulfilled the UE triggers a resume procedure towards the target cell fulfilling the condition.

Intra-RAT, Inter-RAT, NR, LTE and Further Disclaimers

Most of the UE (and network) actions defined herein are described as being performed in NR or LTE. In other words, the configuration of a conditional HO received in NR and executed in NR. However, the method is also applicable in the other following cases, at least:

UE is configured with a conditional HO in NR, possibly with NR beam information and/or LTE measurements, then the condition is triggered and UE executes the HO in LTE. In the case of NR conditions, for example, these may be based on SSB and/or CSI-RS;

UE is configured with a conditional HO in LTE, possibly with NR beam information and/or LTE measurement quantities, then the condition is triggered and UE executes the HO in NR. In the case of NR conditions, for example, these may be based on SSB and/or CSI-RS;

Or, in more general terms, UE is configured with a conditional HO in RAT-1, possibly with beam information for RAT-1 and/or RAT-2 measurement quantities, then the condition is triggered and UE executes the HO in RAT-2;

Most of the UE (and network) actions defined in the disclosure are described in terms of handover or reconfigurations with sync, which may comprise the change of a cell. However, the method also comprises the cases where a cell is added, for example in case of multi-connectivity scenarios such as carrier aggregation, dual connectivity, EN-DC, NR-DC, MR-DC, etc. In that case, the configuration of a conditional HO as described in the disclosure may be described as a conditional configuration for SCG addition or SCell addition, or equivalent. The method also comprises the case of intra-cell procedure relying on conditional mobility e.g. a reconfiguration with sync with cell identity the same as a serving cell.

Beam information may either be from a serving cell, a neighbor cell, or a combination of beam information from serving and neighbor cell. For example, a condition may be defined when a number of good beams in serving goes below a threshold and number of good beams in target goes above a threshold.

Good beams may be defined as the best (e.g. the ones with the highest value of a given measurement quantity like RSRP, RSRQ, SINR, or some other quantity) and the ones above a pre-defined threshold. The method may comprise that only good beams are considered as part of the conditions.

In one embodiment, the CHO trigger condition is that the potential target cell has a certain number of beams above a configured quality threshold (where the threshold can be measured in terms of RSRP, RSRQ, SINR or SNR).

In another embodiment, the CHO trigger condition is that cell quality of the potential target cell is at least a configured offset better than the cell quality of the serving cell and a certain number of beams of the potential target cell are above a configured quality threshold (where the offset can be expressed in dB or watts and the threshold can be measured in terms of RSRP, RSRQ, SINR or SNR).

In another embodiment, the CHO trigger condition is that that cell quality of the potential target cell is at least a configured offset better than the cell quality of the serving cell or a certain number of beams of the potential target cell are above a configured quality threshold (where the offset can be expressed in dB or watts and the threshold can be measured in terms of RSRP, RSRQ, SINR or SNR).

In another embodiment, the CHO trigger condition is that that the potential target cell has more beams above a configured threshold than the serving cell has (where the threshold can be measured in terms of RSRP, RSRQ, SINR or SNR).

In another embodiment, the CHO trigger condition is that the best beam of the potential target cell exceeds a first threshold X1 (in terms of RSRP, RSRQ, SINR or SNR) and the second best beam exceeds a second threshold X2 (in terms of RSRP, RSRQ, SINR or SNR), where X1>X2. This can also be expressed as follows: At least one beam exceeds a first threshold X1 (in terms of RSRP, RSRQ, SINR or SNR) and at least two beams exceed a second threshold X2 (in terms of RSRP, RSRQ, SINR or SNR), where X1>X2.

This can be generalized to: At least N1 beams exceed(s) a first threshold X1 and at least N2 beams exceed a second threshold X2 . . . and at least Nn beams exceed a threshold Xn (where X1>X2> . . . >Xn, Nn> . . . >N2>N1 and the thresholds X1, X2, . . . Xn are expressed in terms of RSRP, RSRQ, SINR or SNR).

In another embodiment, the CHO trigger condition for a potential target cell is that its best beam is at least X1 better than the best beam of the serving cell and the second best beam of the potential target cell is at least X2 better than the second best beam of the serving cell (where the offsets X1 and X2 are expressed in dB or W and associated with RSRP, RSRQ, SINR or SNR measurements). This may be generalized to: The best beam of the potential target cell is at least X1 better than the best beam of the serving cell and the second best beam of the potential target cell is at least X2 better than the second best beam of the serving cell . . . and the $n^{th}$ best beam of the potential target cell is at least Xn better than the $n^{th}$ best beam of the serving cell (where the offsets X1, X2, . . . Xn are expressed in dB or W and associated with RSRP, RSRQ, SINR or SNR measurements).

In another embodiment, the CHO trigger condition is that at least N1 beam(s) exceed(s) a first threshold X1 or at least N2 beams exceed a second threshold X2 . . . [or at least Nn beams exceed an $n^{th}$ threshold Xn] (where X1>X2> . . . >Xn, N1>N2> . . . >Nn and the thresholds X1, X2, . . . Xn are expressed in terms of RSRP, RSRQ, SINR or SNR).

In another embodiment, the CHO trigger condition is that at least one beam of the potential target cell is at least X1 better than the best beam of the serving cell or at least N1 beams of the potential target cell are at least X2 better than the second best beam of the serving cell . . . or at least Nn beams of the potential target cell are at least Xn better than the $n^{th}$ best beam of the serving cell (where Nn> . . . >N1>1 and the offsets X1, X2, . . . Xn are expressed in dB or W and associated with RSRP, RSRQ, SINR or SNR measurements).

In another embodiment, the UE is configured to perform L1 reporting of beams form serving and neighboring cells so that the source realizes changes in beam conditions so that it can cancel and/or update the conditional mobility configurations.

Using Beam-Based Cell Reselection-Like Rules to Trigger Conditional Handover

In another set of embodiments, beam-based cell reselection-like rules are used as trigger condition for conditional handover.

In one embodiment, beam-related information per cell is used as selection criteria (or ranking criteria to then assist the UE to perform a selection) in the case multiple cells fulfill the conditional handover trigger condition. Since the UE needs to select only one cell to execute the conditional handover, in that case, selection criteria are needed.

In one variant, the UE executes conditional handover to the cell with the highest number of beams above a configurable threshold (i.e., absThreshSS-BlocksConsolidation) among the triggering cells, i.e., the cells fulfilling the conditional handover triggering condition (e.g., A3-like event).

In another variant, a measurementRange parameter is introduced for the purpose of conditional handover cell selection, e.g., when multiple cells fulfill the trigger condition for conditional handover. If measurementRange is configured, then the UE shall execute conditional handover to the cell with the highest number of beams above the threshold (i.e. absThreshSS-BlocksConsolidation) among the cells fulfilling the conditional handover triggering conditional and whose cell level measurement quantity (e.g. cell RSRP, cell RSRQ, cell SINR, etc.) is within measurementRange of the measurement quantity (e.g. cell RSRP, cell RSRQ, cell SINR, etc.) of the highest ranked cell, assuming that among the cells fulfilling the conditional handover triggering condition there is a baseline ranking/sorting criteria e.g. based on a measurement quantity.

The measurement quantity in this variant may be fixed in the specifications, e.g., RSRP. Or, alternatively, it may be configured, for example, within the structure of the ASN.1 of measurementRange, which may be a CHOICE between RSRP, RSRQ or SINR. That may also have multiple trigger quantities combined, either with an OR logic or AND logic.

To give an example to illustrate, let us assume that cells are sorted based on highest RSRP, when multiple fulfill at a certain time a conditional handover triggering condition. Then, UE may have the following list after sorting based on RSRP:

Cell 101—RSRP 0 dbm (1 beam above threshold absThreshSS-BlocksConsolidation)

Cell 207—RSRP −5 dbm (4 beams above threshold absThreshSS-BlocksConsolidation)

Cell 7—RSRP −10 dbm (2 beams above threshold absThreshSS-BlocksConsolidation)

If measurementRange is configured with the value −7 dB, then cells 101 and 207 are included in the rule and the cell 207 is the one with highest number of beams above the threshold and within the range. In that sense, cell 207 would be selected.

In more general terms, the embodiment relies on a cell-based sorting rule when multiple cells fulfill the triggering condition of conditional handover at a given point in time. One of the rules can be based on a configurable measurement quantity (e.g., RSRP, RSRQ or SINR). Another rule could be based on a fixed measurement quantity (e.g., RSRP, RSRQ or SINR). And, another rule can be based on available measurement quantities, e.g.:

If a single measurement quantity is available, use that as the sorting quantity (i.e. the first cell is the one with the highest value for that quantity)

Otherwise, if multiple quantities are available for the multiple cells:

Use RSRP, if available;

Else, use RSRQ

Else, use SINR

In another embodiment, these rules based on beam-related information per cell are used as trigger conditions. For example, there can be an integer threshold (N=1 . . . 64) for the number of beams above a configurable threshold. Hence, a triggering condition for conditional handover is only fulfilled if the number of beams of a cell above a quantity threshold (e.g. to detect only good beams) is above the integer threshold (e.g. called number of good beams). In that sense, only cells with a minimum number of good detected beams could be triggering cells. Notice that the previous embodiments for cell sorting and selection of a cell in case multiple cells fulfill the condition is still applicable. For example, cells could fulfill the conditions based on beams, but still have different number of good beams, which could be used as criteria for selection for executing the CHO.

Selection Criterion Vs. Triggering Condition

As described in the previous embodiment, the beam related information to support the triggering of conditional handover may be used as follows:

As part of the trigger condition;

As part of the selection criteria in case multiple cells fulfill a trigger condition;

As both part of the trigger condition and, as part of the selection criteria in case multiple cells fulfill a trigger condition.

Different RS Types in NR

In another set of embodiments, beams are characterized as being measurements of a given reference signal. In the context of the proposed solutions, there is at least one reference signal that is measured, such as an SSB or a CSI-RS, e.g. in the case the method is applied in 5G NR UEs.

However, rules as defined in the previous embodiments may be defined for beam-related information based on a combination of measurements in different reference signals, such as measurements based on SSBs and CSI-RS. For example, one could define that the trigger condition for CHO is fulfilled when number of beams above threshold based on SSB is higher than X1, AND, number of beams above another threshold based on CSI-RS is higher than X2. There is no need to repeat all other embodiments here, but this illustrates that the term beams may be extended to these logical AND/OR rules to combine measurement information for beam measurement information where measurements are performed in different reference signals (which may indicate different beamforming properties, like wide beams in SSBs and narrow beams in CSI.RS). A similar aspect is applicable in case this beam measurement-related information is used as input to the sorting/ranking/Selection rule in case multiple cells fulfil the triggering condition for conditional handover.

The various embodiments disclosed herein have been discussed in terms of UEs and network nodes operating in wireless networks. These apparatuses and systems will now be described in more detail.

Figure 7:
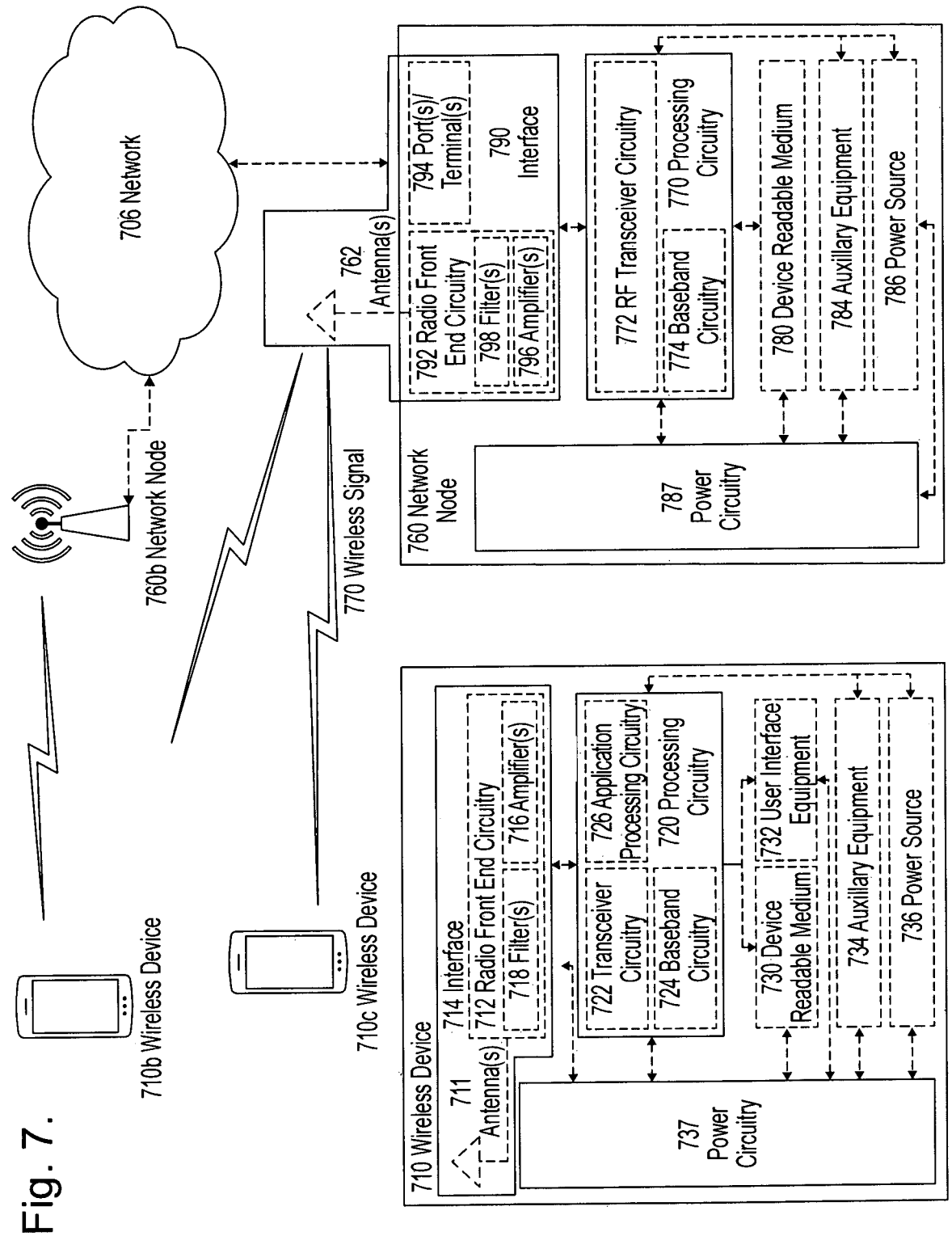
FIG. 7 is a schematic diagram of a wireless network in accordance with some embodiments.

Although the subject matter described herein may be implemented in any appropriate type of system using any suitable components, the embodiments disclosed herein are described in relation to a wireless network, such as the example wireless network illustrated in FIG. 7. For simplicity, the wireless network of FIG. 7 only depicts network 706, network nodes 760 and 760b, and WDs 710, 710b, and 710c. In practice, a wireless network may further include any additional elements suitable to support communication between wireless devices or between a wireless device and another communication device, such as a landline telephone, a service provider, or any other network node or end device. Of the illustrated components, network node 760 and wireless device (WD) 710 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 706 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 760 and WD 710 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 7, network node 760 includes processing circuitry 770, device readable medium 780, interface 790, auxiliary equipment 784, power source 786, power circuitry 787, and antenna 762. Although network node 760 illustrated in the example wireless network of FIG. 7 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 760 are depicted as single boxes located within a larger box, or nested within multiple boxes, in practice, a network node may comprise multiple different physical components that make up a single illustrated component (e.g., device readable medium 780 may comprise multiple separate hard drives as well as multiple RAM modules).

Similarly, network node 760 may be composed of multiple physically separate components (e.g., a NodeB component and a RNC component, or a BTS component and a BSC component, etc.), which may each have their own respective components. In certain scenarios in which network node 760 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 760 may be configured to support multiple radio access technologies (RATs). In such embodiments, some components may be duplicated (e.g., separate device readable medium 780 for the different RATs) and some components may be reused (e.g., the same antenna 762 may be shared by the RATs). Network node 760 may also include multiple sets of the various illustrated components for different wireless technologies integrated into network node 760, such as, for example, GSM, WCDMA, LTE, NR, WiFi, or Bluetooth wireless technologies. These wireless technologies may be integrated into the same or different chip or set of chips and other components within network node 760.

Processing circuitry 770 is configured to perform any determining, calculating, or similar operations (e.g., certain obtaining operations) described herein as being provided by a network node. These operations performed by processing circuitry 770 may include processing information obtained by processing circuitry 770 by, for example, converting the obtained information into other information, comparing the obtained information or converted information to information stored in the network node, and/or performing one or more operations based on the obtained information or converted information, and as a result of said processing making a determination.

Processing circuitry 770 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 760 components, such as device readable medium 780, network node 760 functionality. For example, processing circuitry 770 may execute instructions stored in device readable medium 780 or in memory within processing circuitry 770. Such functionality may include providing any of the various wireless features, functions, or benefits discussed herein. In some embodiments, processing circuitry 770 may include a system on a chip (SOC).

In some embodiments, processing circuitry 770 may include one or more of radio frequency (RF) transceiver circuitry 772 and baseband processing circuitry 774. In some embodiments, radio frequency (RF) transceiver circuitry 772 and baseband processing circuitry 774 may be on separate chips (or sets of chips), boards, or units, such as radio units and digital units. In alternative embodiments, part or all of RF transceiver circuitry 772 and baseband processing circuitry 774 may be on the same chip or set of chips, boards, or units In certain embodiments, some or all of the functionality described herein as being provided by a network node, base station, eNB or other such network device may be performed by processing circuitry 770 executing instructions stored on device readable medium 780 or memory within processing circuitry 770. In alternative embodiments, some or all of the functionality may be provided by processing circuitry 770 without executing instructions stored on a separate or discrete device readable medium, such as in a hard-wired manner. In any of those embodiments, whether executing instructions stored on a device readable storage medium or not, processing circuitry 770 can be configured to perform the described functionality. The benefits provided by such functionality are not limited to processing circuitry 770 alone or to other components of network node 760, but are enjoyed by network node 760 as a whole, and/or by end users and the wireless network generally.

Device readable medium 780 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 770. Device readable medium 780 may store any suitable instructions, data or information, including a computer program, software, an application including one or more of logic, rules, code, tables, etc. and/or other instructions capable of being executed by processing circuitry 770 and, utilized by network node 760. Device readable medium 780 may be used to store any calculations made by processing circuitry 770 and/or any data received via interface 790. In some embodiments, processing circuitry 770 and device readable medium 780 may be considered to be integrated.

Interface 790 is used in the wired or wireless communication of signalling and/or data between network node 760, network 706, and/or WDs 710. As illustrated, interface 790 comprises port(s)/terminal(s) 794 to send and receive data, for example to and from network 706 over a wired connection. Interface 790 also includes radio front end circuitry 792 that may be coupled to, or in certain embodiments a part of, antenna 762. Radio front end circuitry 792 comprises filters 798 and amplifiers 796. Radio front end circuitry 792 may be connected to antenna 762 and processing circuitry 770.

Radio front end circuitry may be configured to condition signals communicated between antenna 762 and processing circuitry 770. Radio front end circuitry 792 may receive digital data that is to be sent out to other network nodes or WDs via a wireless connection. Radio front end circuitry 792 may convert the digital data into a radio signal having the appropriate channel and bandwidth parameters using a combination of filters 798 and/or amplifiers 796. The radio signal may then be transmitted via antenna 762. Similarly, when receiving data, antenna 762 may collect radio signals which are then converted into digital data by radio front end circuitry 792. The digital data may be passed to processing circuitry 770. In other embodiments, the interface may comprise different components and/or different combinations of components.

In certain alternative embodiments, network node 760 may not include separate radio front end circuitry 792, instead, processing circuitry 770 may comprise radio front end circuitry and may be connected to antenna 762 without separate radio front end circuitry 792. Similarly, in some embodiments, all or some of RF transceiver circuitry 772 may be considered a part of interface 790. In still other embodiments, interface 790 may include one or more ports or terminals 794, radio front end circuitry 792, and RF transceiver circuitry 772, as part of a radio unit (not shown), and interface 790 may communicate with baseband processing circuitry 774, which is part of a digital unit (not shown).

Antenna 762 may include one or more antennas, or antenna arrays, configured to send and/or receive wireless signals. Antenna 762 may be coupled to radio front end circuitry 790 and may be any type of antenna capable of transmitting and receiving data and/or signals wirelessly. In some embodiments, antenna 762 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 762 may be separate from network node 760 and may be connectable to network node 760 through an interface or port.

Antenna 762, interface 790, and/or processing circuitry 770 may be configured to perform any receiving operations and/or certain obtaining operations described herein as being performed by a network node. Any information, data and/or signals may be received from a wireless device, another network node and/or any other network equipment. Similarly, antenna 762, interface 790, and/or processing circuitry 770 may be configured to perform any transmitting operations described herein as being performed by a network node. Any information, data and/or signals may be transmitted to a wireless device, another network node and/or any other network equipment.

Power circuitry 787 may comprise, or be coupled to, power management circuitry and is configured to supply the components of network node 760 with power for performing the functionality described herein. Power circuitry 787 may receive power from power source 786. Power source 786 and/or power circuitry 787 may be configured to provide power to the various components of network node 760 in a form suitable for the respective components (e.g., at a voltage and current level needed for each respective component). Power source 786 may either be included in, or external to, power circuitry 787 and/or network node 760. For example, network node 760 may be connectable to an external power source (e.g., an electricity outlet) via an input circuitry or interface such as an electrical cable, whereby the external power source supplies power to power circuitry 787. As a further example, power source 786 may comprise a source of power in the form of a battery or battery pack which is connected to, or integrated in, power circuitry 787. The battery may provide backup power should the external power source fail. Other types of power sources, such as photovoltaic devices, may also be used.

Alternative embodiments of network node 760 may include additional components beyond those shown in FIG. 7 that may be responsible for providing certain aspects of the network node's functionality, including any of the functionality described herein and/or any functionality necessary to support the subject matter described herein. For example, network node 760 may include user interface equipment to allow input of information into network node 760 and to allow output of information from network node 760. This may allow a user to perform diagnostic, maintenance, repair, and other administrative functions for network node 760.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 710 includes antenna 711, interface 714, processing circuitry 720, device readable medium 730, user interface equipment 732, auxiliary equipment 734, power source 736 and power circuitry 737. WD 710 may include multiple sets of one or more of the illustrated components for different wireless technologies supported by WD 710, such as, for example, GSM, WCDMA, LTE, NR, WiFi, WiMAX, or Bluetooth wireless technologies, just to mention a few. These wireless technologies may be integrated into the same or different chips or set of chips as other components within WD 710.

Antenna 711 may include one or more antennas or antenna arrays, configured to send and/or receive wireless signals, and is connected to interface 714. In certain alternative embodiments, antenna 711 may be separate from WD 710 and be connectable to WD 710 through an interface or port. Antenna 711, interface 714, and/or processing circuitry 720 may be configured to perform any receiving or transmitting operations described herein as being performed by a WD. Any information, data and/or signals may be received from a network node and/or another WD. In some embodiments, radio front end circuitry and/or antenna 711 may be considered an interface.

As illustrated, interface 714 comprises radio front end circuitry 712 and antenna 711. Radio front end circuitry 712 comprise one or more filters 718 and amplifiers 716. Radio front end circuitry 714 is connected to antenna 711 and processing circuitry 720, and is configured to condition signals communicated between antenna 711 and processing circuitry 720. Radio front end circuitry 712 may be coupled to or a part of antenna 711. In some embodiments, WD 710 may not include separate radio front end circuitry 712; rather, processing circuitry 720 may comprise radio front end circuitry and may be connected to antenna 711. Similarly, in some embodiments, some or all of RF transceiver circuitry 722 may be considered a part of interface 714. Radio front end circuitry 712 may receive digital data that is to be sent out to other network nodes or WDs via a wireless connection. Radio front end circuitry 712 may convert the digital data into a radio signal having the appropriate channel and bandwidth parameters using a combination of filters 718 and/or amplifiers 716. The radio signal may then be transmitted via antenna 711. Similarly, when receiving data, antenna 711 may collect radio signals which are then converted into digital data by radio front end circuitry 712. The digital data may be passed to processing circuitry 720. In other embodiments, the interface may comprise different components and/or different combinations of components.

Processing circuitry 720 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 710 components, such as device readable medium 730, WD 710 functionality. Such functionality may include providing any of the various wireless features or benefits discussed herein. For example, processing circuitry 720 may execute instructions stored in device readable medium 730 or in memory within processing circuitry 720 to provide the functionality disclosed herein.

As illustrated, processing circuitry 720 includes one or more of RF transceiver circuitry 722, baseband processing circuitry 724, and application processing circuitry 726. In other embodiments, the processing circuitry may comprise different components and/or different combinations of components. In certain embodiments processing circuitry 720 of WD 710 may comprise a SOC. In some embodiments, RF transceiver circuitry 722, baseband processing circuitry 724, and application processing circuitry 726 may be on separate chips or sets of chips. In alternative embodiments, part or all of baseband processing circuitry 724 and application processing circuitry 726 may be combined into one chip or set of chips, and RF transceiver circuitry 722 may be on a separate chip or set of chips. In still alternative embodiments, part or all of RF transceiver circuitry 722 and baseband processing circuitry 724 may be on the same chip or set of chips, and application processing circuitry 726 may be on a separate chip or set of chips. In yet other alternative embodiments, part or all of RF transceiver circuitry 722, baseband processing circuitry 724, and application processing circuitry 726 may be combined in the same chip or set of chips. In some embodiments, RF transceiver circuitry 722 may be a part of interface 714. RF transceiver circuitry 722 may condition RF signals for processing circuitry 720.

In certain embodiments, some or all of the functionality described herein as being performed by a WD may be provided by processing circuitry 720 executing instructions stored on device readable medium 730, which in certain embodiments may be a computer-readable storage medium. In alternative embodiments, some or all of the functionality may be provided by processing circuitry 720 without executing instructions stored on a separate or discrete device readable storage medium, such as in a hard-wired manner. In any of those particular embodiments, whether executing instructions stored on a device readable storage medium or not, processing circuitry 720 can be configured to perform the described functionality. The benefits provided by such functionality are not limited to processing circuitry 720 alone or to other components of WD 710, but are enjoyed by WD 710 as a whole, and/or by end users and the wireless network generally.

Processing circuitry 720 may be configured to perform any determining, calculating, or similar operations (e.g., certain obtaining operations) described herein as being performed by a WD. These operations, as performed by processing circuitry 720, may include processing information obtained by processing circuitry 720 by, for example, converting the obtained information into other information, comparing the obtained information or converted information to information stored by WD 710, and/or performing one or more operations based on the obtained information or converted information, and as a result of said processing making a determination.

Device readable medium 730 may be operable to store a computer program, software, an application including one or more of logic, rules, code, tables, etc. and/or other instructions capable of being executed by processing circuitry 720. Device readable medium 730 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 720. In some embodiments, processing circuitry 720 and device readable medium 730 may be considered to be integrated.

User interface equipment 732 may provide components that allow for a human user to interact with WD 710. Such interaction may be of many forms, such as visual, audial, tactile, etc. User interface equipment 732 may be operable to produce output to the user and to allow the user to provide input to WD 710. The type of interaction may vary depending on the type of user interface equipment 732 installed in WD 710. For example, if WD 710 is a smart phone, the interaction may be via a touch screen; if WD 710 is a smart meter, the interaction may be through a screen that provides usage (e.g., the number of gallons used) or a speaker that provides an audible alert (e.g., if smoke is detected). User interface equipment 732 may include input interfaces, devices and circuits, and output interfaces, devices and circuits. User interface equipment 732 is configured to allow input of information into WD 710, and is connected to processing circuitry 720 to allow processing circuitry 720 to process the input information. User interface equipment 732 may include, for example, a microphone, a proximity or other sensor, keys/buttons, a touch display, one or more cameras, a USB port, or other input circuitry. User interface equipment 732 is also configured to allow output of information from WD 710, and to allow processing circuitry 720 to output information from WD 710. User interface equipment 732 may include, for example, a speaker, a display, vibrating circuitry, a USB port, a headphone interface, or other output circuitry. Using one or more input and output interfaces, devices, and circuits, of user interface equipment 732, WD 710 may communicate with end users and/or the wireless network, and allow them to benefit from the functionality described herein.

Auxiliary equipment 734 is operable to provide more specific functionality which may not be generally performed by WDs. This may comprise specialized sensors for doing measurements for various purposes, interfaces for additional types of communication such as wired communications etc. The inclusion and type of components of auxiliary equipment 734 may vary depending on the embodiment and/or scenario.

Power source 736 may, in some embodiments, be in the form of a battery or battery pack. Other types of power sources, such as an external power source (e.g., an electricity outlet), photovoltaic devices or power cells, may also be used. WD 710 may further comprise power circuitry 737 for delivering power from power source 736 to the various parts of WD 710 which need power from power source 736 to carry out any functionality described or indicated herein. Power circuitry 737 may in certain embodiments comprise power management circuitry. Power circuitry 737 may additionally or alternatively be operable to receive power from an external power source; in which case WD 710 may be connectable to the external power source (such as an electricity outlet) via input circuitry or an interface such as an electrical power cable. Power circuitry 737 may also in certain embodiments be operable to deliver power from an external power source to power source 736. This may be, for example, for the charging of power source 736. Power circuitry 737 may perform any formatting, converting, or other modification to the power from power source 736 to make the power suitable for the respective components of WD 710 to which power is supplied.

Figure 8:
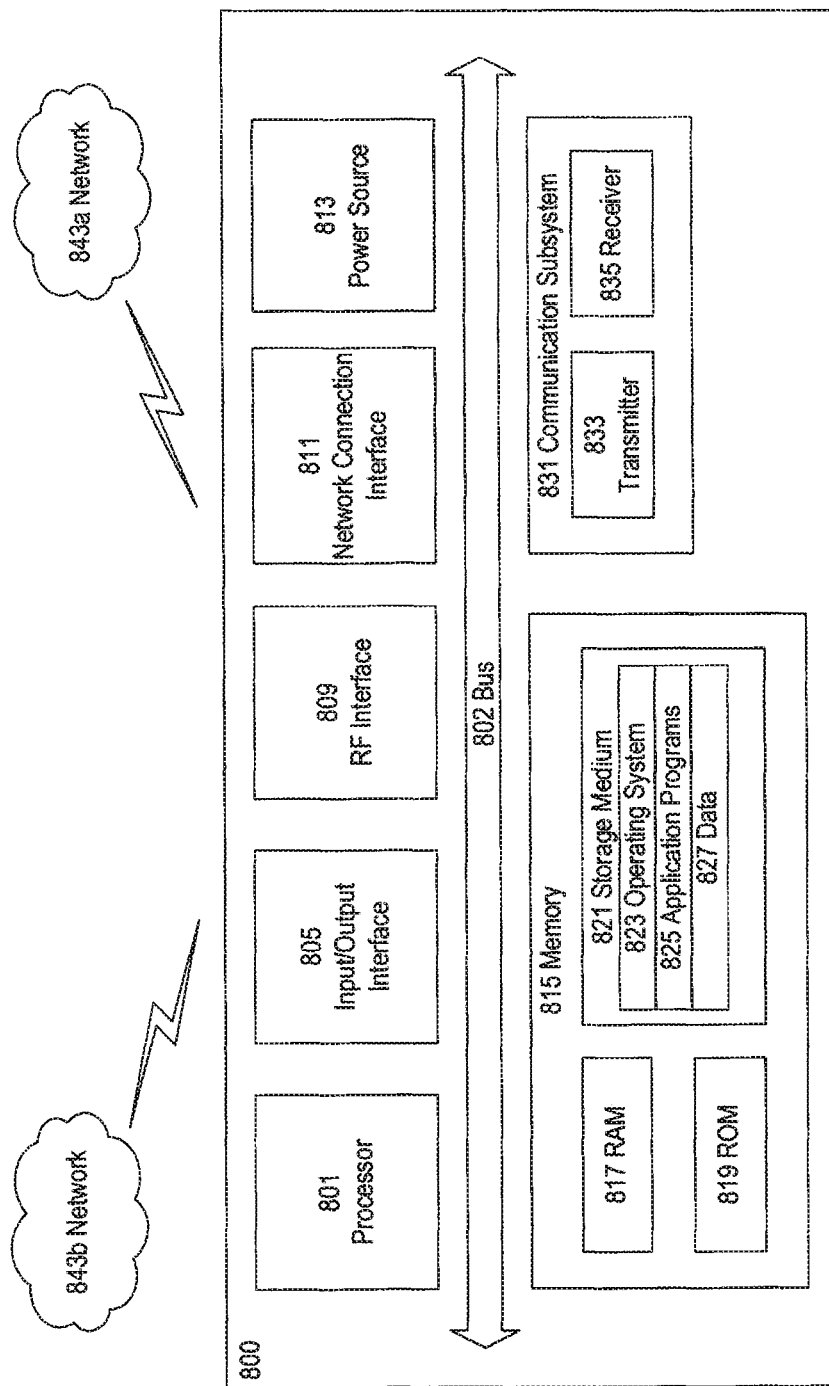
FIG. 8 is a schematic diagram of a user equipment in accordance with some embodiments.

FIG. 8 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 8200 may be any UE identified by the $3^{rd}$ Generation Partnership Project (3GPP), including a NB-IoT UE, a machine type communication (MTC) UE, and/or an enhanced MTC (eMTC) UE. UE 800, as illustrated in FIG. 8, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 8 is a UE, the components discussed herein are equally applicable to a WD, and vice-versa.

In FIG. 8, UE 800 includes processing circuitry 801 that is operatively coupled to input/output interface 805, radio frequency (RF) interface 809, network connection interface 811, memory 815 including random access memory (RAM) 817, read-only memory (ROM) 819, and storage medium 821 or the like, communication subsystem 831, power source 833, and/or any other component, or any combination thereof. Storage medium 821 includes operating system 823, application program 825, and data 827. In other embodiments, storage medium 821 may include other similar types of information. Certain UEs may utilize all of the components shown in FIG. 8, or only a subset of the components. The level of integration between the components may vary from one UE to another UE. Further, certain UEs may contain multiple instances of a component, such as multiple processors, memories, transceivers, transmitters, receivers, etc.

In FIG. 8, processing circuitry 801 may be configured to process computer instructions and data. Processing circuitry 801 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 801 may include two central processing units (CPUs). Data may be information in a form suitable for use by a computer.

In the depicted embodiment, input/output interface 805 may be configured to provide a communication interface to an input device, output device, or input and output device. UE 800 may be configured to use an output device via input/output interface 805. An output device may use the same type of interface port as an input device. For example, a USB port may be used to provide input to and output from UE 800. The output device may be a speaker, a sound card, a video card, a display, a monitor, a printer, an actuator, an emitter, a smartcard, another output device, or any combination thereof. UE 800 may be configured to use an input device via input/output interface 805 to allow a user to capture information into UE 800. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 8, RF interface 809 may be configured to provide a communication interface to RF components such as a transmitter, a receiver, and an antenna. Network connection interface 811 may be configured to provide a communication interface to network 843a. Network 843a may encompass wired and/or wireless networks such as a local-area network (LAN), a wide-area network (WAN), a computer network, a wireless network, a telecommunications network, another like network or any combination thereof. For example, network 843a may comprise a Wi-Fi network. Network connection interface 811 may be configured to include a receiver and a transmitter interface used to communicate with one or more other devices over a communication network according to one or more communication protocols, such as Ethernet, TCP/IP, SONET, ATM, or the like. Network connection interface 811 may implement receiver and transmitter functionality appropriate to the communication network links (e.g., optical, electrical, and the like). The transmitter and receiver functions may share circuit components, software or firmware, or alternatively may be implemented separately.

RAM 817 may be configured to interface via bus 802 to processing circuitry 801 to provide storage or caching of data or computer instructions during the execution of software programs such as the operating system, application programs, and device drivers. ROM 819 may be configured to provide computer instructions or data to processing circuitry 801. For example, ROM 819 may be configured to store invariant low-level system code or data for basic system functions such as basic input and output (I/O), startup, or reception of keystrokes from a keyboard that are stored in a non-volatile memory. Storage medium 821 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 821 may be configured to include operating system 823, application program 825 such as a web browser application, a widget or gadget engine or another application, and data file 827. Storage medium 821 may store, for use by UE 800, any of a variety of various operating systems or combinations of operating systems.

Storage medium 821 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 821 may allow UE 800 to access computer-executable instructions, application programs or the like, stored on transitory or non-transitory memory media, to off-load data, or to upload data. An article of manufacture, such as one utilizing a communication system may be tangibly embodied in storage medium 821, which may comprise a device readable medium.

In FIG. 8, processing circuitry 801 may be configured to communicate with network 843b using communication subsystem 831. Network 843a and network 843b may be the same network or networks or different network or networks. Communication subsystem 831 may be configured to include one or more transceivers used to communicate with network 843b. For example, communication subsystem 831 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 833 and/or receiver 835 to implement transmitter or receiver functionality, respectively, appropriate to the RAN links (e.g., frequency allocations and the like). Further, transmitter 833 and receiver 835 of each transceiver may share circuit components, software or firmware, or alternatively may be implemented separately.

In the illustrated embodiment, the communication functions of communication subsystem 831 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 831 may include cellular communication, Wi-Fi communication, Bluetooth communication, and GPS communication. Network 843b may encompass wired and/or wireless networks such as a local-area network (LAN), a wide-area network (WAN), a computer network, a wireless network, a telecommunications network, another like network or any combination thereof. For example, network 843b may be a cellular network, a Wi-Fi network, and/or a near-field network. Power source 813 may be configured to provide alternating current (AC) or direct current (DC) power to components of UE 800.

The features, benefits and/or functions described herein may be implemented in one of the components of UE 800 or partitioned across multiple components of UE 800. Further, the features, benefits, and/or functions described herein may be implemented in any combination of hardware, software or firmware. In one example, communication subsystem 831 may be configured to include any of the components described herein. Further, processing circuitry 801 may be configured to communicate with any of such components over bus 802. In another example, any of such components may be represented by program instructions stored in memory that when executed by processing circuitry 801 perform the corresponding functions described herein. In another example, the functionality of any of such components may be partitioned between processing circuitry 801 and communication subsystem 831. In another example, the non-computationally intensive functions of any of such components may be implemented in software or firmware and the computationally intensive functions may be implemented in hardware.

Figure 9:
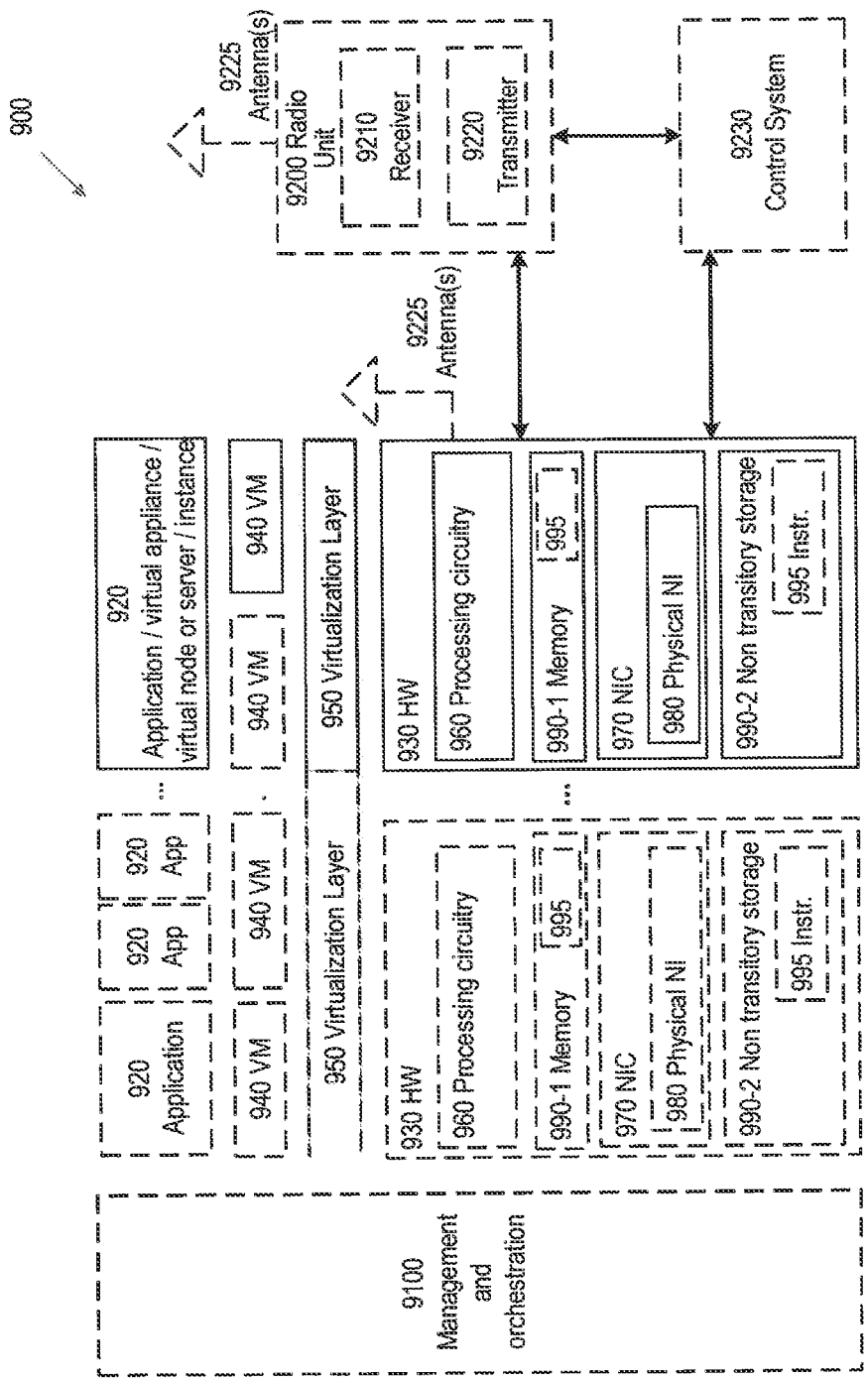
FIG. 9 is a schematic diagram of a virtualization environment in accordance with some embodiments.

FIG. 9 is a schematic block diagram illustrating a virtualization environment 900 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 900 hosted by one or more of hardware nodes 930. Further, in embodiments in which the virtual node is not a radio access node or does not require radio connectivity (e.g., a core network node), then the network node may be entirely virtualized.

The functions may be implemented by one or more applications 920 (which may alternatively be called software instances, virtual appliances, network functions, virtual nodes, virtual network functions, etc.) operative to implement some of the features, functions, and/or benefits of some of the embodiments disclosed herein. Applications 920 are run in virtualization environment 900 which provides hardware 930 comprising processing circuitry 960 and memory 990. Memory 990 contains instructions 995 executable by processing circuitry 960 whereby application 920 is operative to provide one or more of the features, benefits, and/or functions disclosed herein.

Virtualization environment 900, comprises general-purpose or special-purpose network hardware devices 930 comprising a set of one or more processors or processing circuitry 960, which may be commercial off-the-shelf (COTS) processors, dedicated Application Specific Integrated Circuits (ASICs), or any other type of processing circuitry including digital or analog hardware components or special purpose processors. Each hardware device may comprise memory 990-1 which may be non-persistent memory for temporarily storing instructions 995 or software executed by processing circuitry 960. Each hardware device may comprise one or more network interface controllers (NICs) 970, also known as network interface cards, which include physical network interface 980. Each hardware device may also include non-transitory, persistent, machine-readable storage media 990-2 having stored therein software 995 and/or instructions executable by processing circuitry 960. Software 995 may include any type of software including software for instantiating one or more virtualization layers 950 (also referred to as hypervisors), software to execute virtual machines 940 as well as software allowing it to execute functions, features and/or benefits described in relation with some embodiments described herein.

Virtual machines 940, comprise virtual processing, virtual memory, virtual networking or interface and virtual storage, and may be run by a corresponding virtualization layer 950 or hypervisor. Different embodiments of the instance of virtual appliance 920 may be implemented on one or more of virtual machines 940, and the implementations may be made in different ways.

During operation, processing circuitry 960 executes software 995 to instantiate the hypervisor or virtualization layer 950, which may sometimes be referred to as a virtual machine monitor (VMM). Virtualization layer 950 may present a virtual operating platform that appears like networking hardware to virtual machine 940.

As shown in FIG. 9, hardware 930 may be a standalone network node with generic or specific components. Hardware 930 may comprise antenna 9225 and may implement some functions via virtualization. Alternatively, hardware 930 may be part of a larger cluster of hardware (e.g. such as in a data center or customer premise equipment (CPE)) where many hardware nodes work together and are managed via management and orchestration (MANO) 9100, which, among others, oversees lifecycle management of applications 920.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 940 may be a software implementation of a physical machine that runs programs as if they were executing on a physical, non-virtualized machine. Each of virtual machines 940, and that part of hardware 930 that executes that virtual machine, be it hardware dedicated to that virtual machine and/or hardware shared by that virtual machine with others of the virtual machines 940, forms a separate virtual network elements (VNE).

Still in the context of NFV, Virtual Network Function (VNF) is responsible for handling specific network functions that run in one or more virtual machines 940 on top of hardware networking infrastructure 930 and corresponds to application 920 in FIG. 9.

In some embodiments, one or more radio units 9200 that each include one or more transmitters 9220 and one or more receivers 9210 may be coupled to one or more antennas 9225. Radio units 9200 may communicate directly with hardware nodes 930 via one or more appropriate network interfaces and may be used in combination with the virtual components to provide a virtual node with radio capabilities, such as a radio access node or a base station.

In some embodiments, some signalling can be effected with the use of control system 9230 which may alternatively be used for communication between the hardware nodes 930 and radio units 9200.

Figure 10:
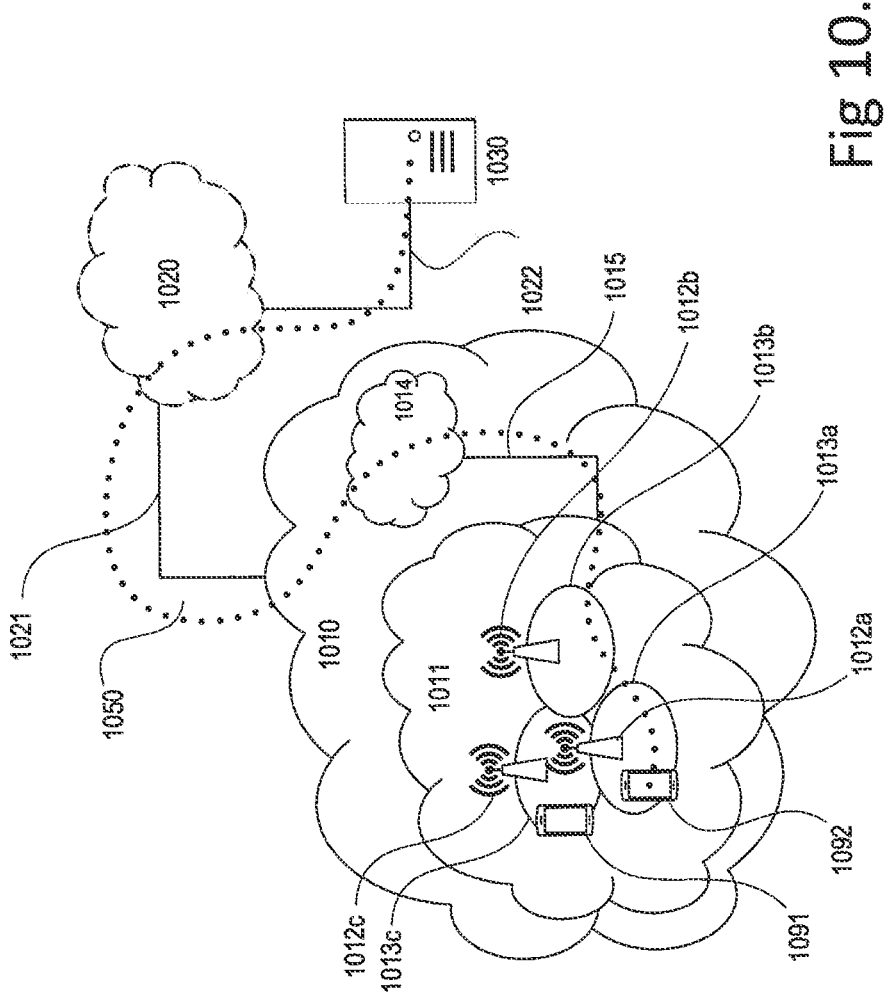
FIG. 10 is a schematic diagram of a telecommunication network connected via an intermediate network to a host computer in accordance with some embodiments.

With reference to FIG. 10, in accordance with an embodiment, a communication system includes telecommunication network 1010, such as a 3GPP-type cellular network, which comprises access network 1011, such as a radio access network, and core network 1014. Access network 1011 comprises a plurality of base stations 1012a, 1012b, 1012c, such as NBs, eNBs, gNBs or other types of wireless access points, each defining a corresponding coverage area 1013a, 1013b, 1013c. Each base station 1012a, 1012b, 1012c is connectable to core network 1014 over a wired or wireless connection 1015. A first UE 1091 located in coverage area 1013c is configured to wirelessly connect to, or be paged by, the corresponding base station 1012c. A second UE 1092 in coverage area 1013a is wirelessly connectable to the corresponding base station 1012a. While a plurality of UEs 1091, 1092 are illustrated in this example, the disclosed embodiments are equally applicable to a situation where a sole UE is in the coverage area or where a sole UE is connecting to the corresponding base station 1012.

Telecommunication network 1010 is itself connected to host computer 1030, which may be embodied in the hardware and/or software of a standalone server, a cloud-implemented server, a distributed server or as processing resources in a server farm. Host computer 1030 may be under the ownership or control of a service provider, or may be operated by the service provider or on behalf of the service provider. Connections 1021 and 1022 between telecommunication network 1010 and host computer 1030 may extend directly from core network 1014 to host computer 1030 or may go via an optional intermediate network 1020. Intermediate network 1020 may be one of, or a combination of more than one of, a public, private or hosted network; intermediate network 1020, if any, may be a backbone network or the Internet; in particular, intermediate network 1020 may comprise two or more sub-networks (not shown).

The communication system of FIG. 10 as a whole enables connectivity between the connected UEs 1091, 1092 and host computer 1030. The connectivity may be described as an over-the-top (OTT) connection 1050. Host computer 1030 and the connected UEs 1091, 1092 are configured to communicate data and/or signaling via OTT connection 1050, using access network 1011, core network 1014, any intermediate network 1020 and possible further infrastructure (not shown) as intermediaries. OTT connection 1050 may be transparent in the sense that the participating communication devices through which OTT connection 1050 passes are unaware of routing of uplink and downlink communications. For example, base station 1012 may not or need not be informed about the past routing of an incoming downlink communication with data originating from host computer 1030 to be forwarded (e.g., handed over) to a connected UE 1091. Similarly, base station 1012 need not be aware of the future routing of an outgoing uplink communication originating from the UE 1091 towards the host computer 1030.

Example implementations, in accordance with an embodiment, of the UE, base station and host computer discussed in the preceding paragraphs will now be described with reference to FIG. 11. In communication system 1100, host computer 1110 comprises hardware 1115 including communication interface 1116 configured to set up and maintain a wired or wireless connection with an interface of a different communication device of communication system 1100. Host computer 1110 further comprises processing circuitry 1118, which may have storage and/or processing capabilities. In particular, processing circuitry 1118 may comprise one or more programmable processors, application-specific integrated circuits, field programmable gate arrays or combinations of these (not shown) adapted to execute instructions. Host computer 1110 further comprises software 1111, which is stored in or accessible by host computer 1110 and executable by processing circuitry 1118. Software 1111 includes host application 1112. Host application 1112 may be operable to provide a service to a remote user, such as UE 1130 connecting via OTT connection 1150 terminating at UE 1130 and host computer 1110. In providing the service to the remote user, host application 1112 may provide user data which is transmitted using OTT connection 1150.

Communication system 1100 further includes base station 1120 provided in a telecommunication system and comprising hardware 1125 enabling it to communicate with host computer 1110 and with UE 1130. Hardware 1125 may include communication interface 1126 for setting up and maintaining a wired or wireless connection with an interface of a different communication device of communication system 1100, as well as radio interface 1127 for setting up and maintaining at least wireless connection 1170 with UE 1130 located in a coverage area (not shown in FIG. 11) served by base station 1120. Communication interface 1126 may be configured to facilitate connection 1160 to host computer 1110. Connection 1160 may be direct or it may pass through a core network (not shown in FIG. 11) of the telecommunication system and/or through one or more intermediate networks outside the telecommunication system. In the embodiment shown, hardware 1125 of base station 1120 further includes processing circuitry 1128, which may comprise one or more programmable processors, application-specific integrated circuits, field programmable gate arrays or combinations of these (not shown) adapted to execute instructions. Base station 1120 further has software 1121 stored internally or accessible via an external connection.

Communication system 1100 further includes UE 1130 already referred to. Its hardware 1135 may include radio interface 1137 configured to set up and maintain wireless connection 1170 with a base station serving a coverage area in which UE 1130 is currently located. Hardware 1135 of UE 1130 further includes processing circuitry 1138, which may comprise one or more programmable processors, application-specific integrated circuits, field programmable gate arrays or combinations of these (not shown) adapted to execute instructions. UE 1130 further comprises software 1131, which is stored in or accessible by UE 1130 and executable by processing circuitry 1138. Software 1131 includes client application 1132. Client application 1132 may be operable to provide a service to a human or non-human user via UE 1130, with the support of host computer 1110. In host computer 1110, an executing host application 1112 may communicate with the executing client application 1132 via OTT connection 1150 terminating at UE 1130 and host computer 1110. In providing the service to the user, client application 1132 may receive request data from host application 1112 and provide user data in response to the request data. OTT connection 1150 may transfer both the request data and the user data. Client application 1132 may interact with the user to generate the user data that it provides.

Figure 11:
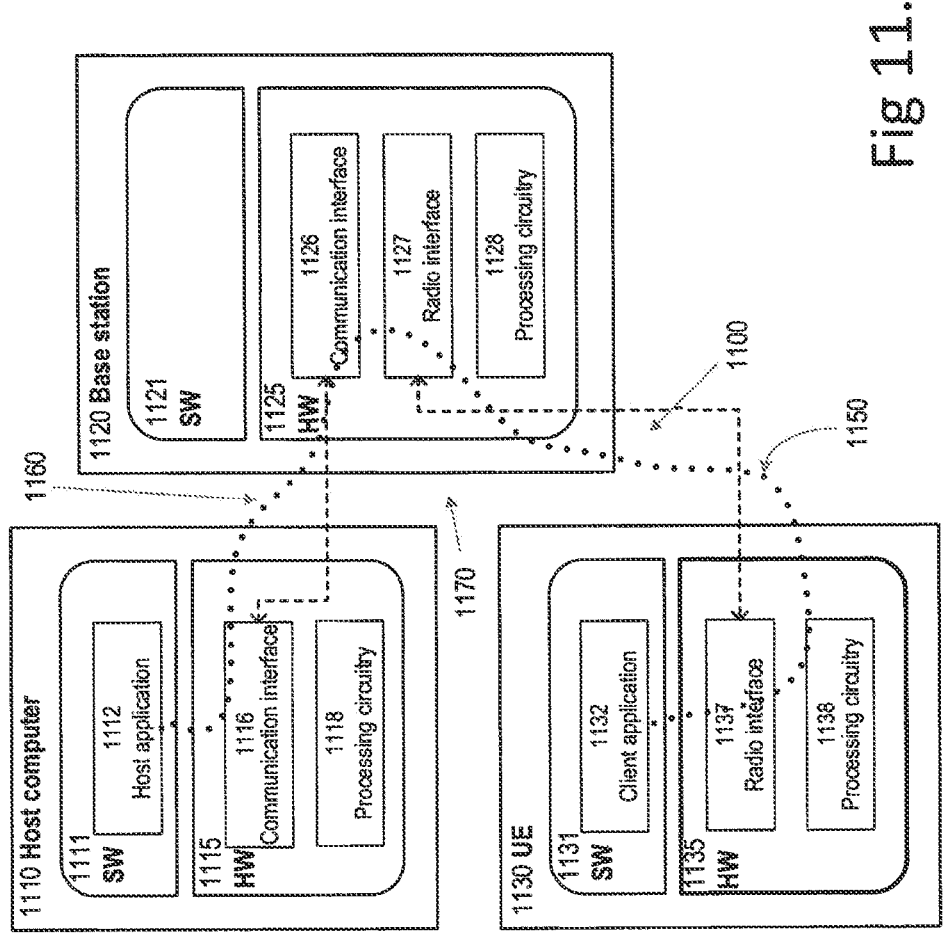
FIG. 11 is a schematic diagram of a host computer communicating via a base station with a user equipment over a partially wireless connection in accordance with some embodiments.

It is noted that host computer 1110, base station 1120 and UE 1130 illustrated in FIG. 11 may be similar or identical to host computer 1030, one of base stations 1012a, 1012b, 1012c and one of UEs 1091, 1092 of FIG. 10, respectively. This is to say, the inner workings of these entities may be as shown in FIG. 11 and independently, the surrounding network topology may be that of FIG. 10.

In FIG. 11, OTT connection 1150 has been drawn abstractly to illustrate the communication between host computer 1110 and UE 1130 via base station 1120, without explicit reference to any intermediary devices and the precise routing of messages via these devices. Network infrastructure may determine the routing, which it may be configured to hide from UE 1130 or from the service provider operating host computer 1110, or both. While OTT connection 1150 is active, the network infrastructure may further take decisions by which it dynamically changes the routing (e.g., on the basis of load balancing consideration or reconfiguration of the network).

Wireless connection 1170 between UE 1130 and base station 1120 is in accordance with the teachings of the embodiments described throughout this disclosure. One or more of the various embodiments improve the performance of OTT services provided to UE 1130 using OTT connection 1150, in which wireless connection 1170 forms the last segment. More precisely, the teachings of these embodiments may improve the latency and power consumption, and thereby provide benefits such as reduced user waiting time, better responsiveness, and extended battery lifetime.

A measurement procedure may be provided for the purpose of monitoring data rate, latency and other factors on which the one or more embodiments improve. There may further be an optional network functionality for reconfiguring OTT connection 1150 between host computer 1110 and UE 1130, in response to variations in the measurement results. The measurement procedure and/or the network functionality for reconfiguring OTT connection 1150 may be implemented in software 1111 and hardware 1115 of host computer 1110 or in software 1131 and hardware 1135 of UE 1130, or both. In embodiments, sensors (not shown) may be deployed in or in association with communication devices through which OTT connection 1150 passes; the sensors may participate in the measurement procedure by supplying values of the monitored quantities exemplified above, or supplying values of other physical quantities from which software 1111, 1131 may compute or estimate the monitored quantities. The reconfiguring of OTT connection 1150 may include message format, retransmission settings, preferred routing etc.; the reconfiguring need not affect base station 1120, and it may be unknown or imperceptible to base station 1120. Such procedures and functionalities may be known and practiced in the art. In certain embodiments, measurements may involve proprietary UE signaling facilitating host computer 1110's measurements of throughput, propagation times, latency and the like. The measurements may be implemented in that software 1111 and 1131 causes messages to be transmitted, in particular empty or 'dummy' messages, using OTT connection 1150 while it monitors propagation times, errors etc.

Figure 12:
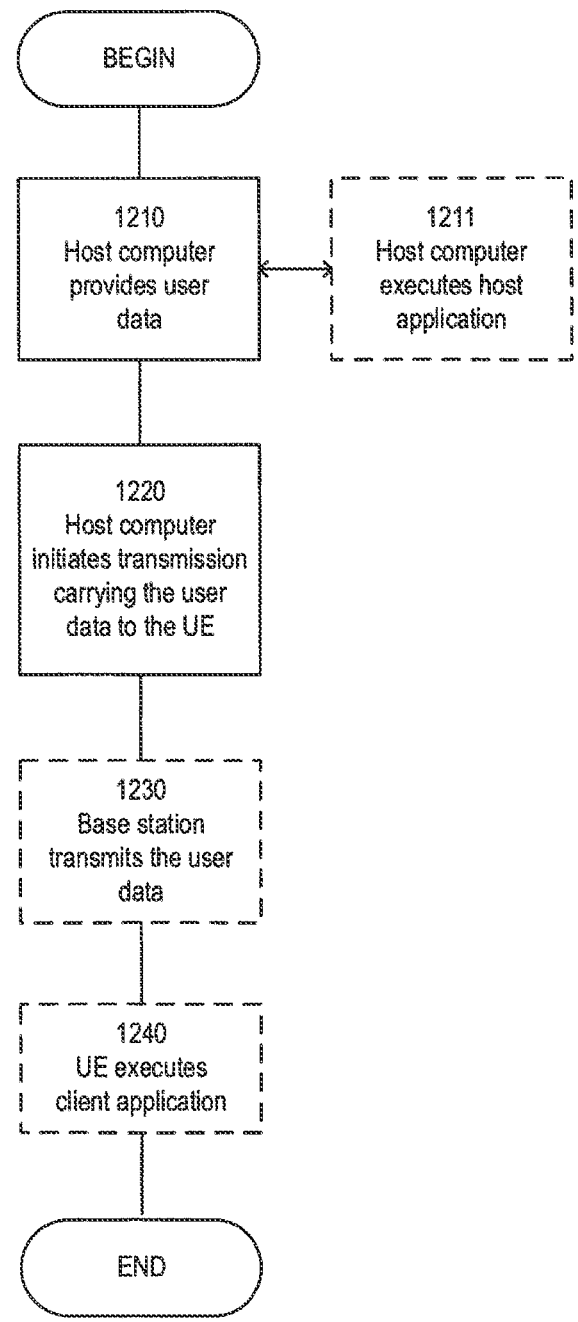
FIG. 12 is a flowchart showing methods implemented in a communication system including a host computer, a base station and a user equipment in accordance with some embodiments.

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In step 1210, the host computer provides user data. In substep 1211 (which may be optional) of step 1210, the host computer provides the user data by executing a host application. In step 1220, the host computer initiates a transmission carrying the user data to the UE. In step 1230 (which may be optional), the base station transmits to the UE the user data which was carried in the transmission that the host computer initiated, in accordance with the teachings of the embodiments described throughout this disclosure. In step 1240 (which may also be optional), the UE executes a client application associated with the host application executed by the host computer.

Figure 13:
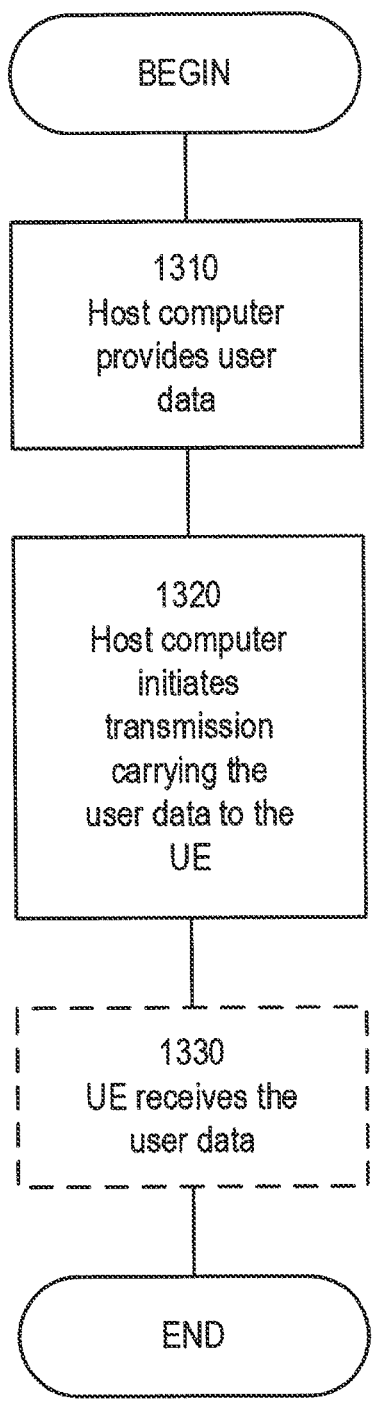
FIG. 13 is a flowchart showing methods implemented in a communication system including a host computer, a base station and a user equipment in accordance with some embodiments.

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In step 1310 of the method, the host computer provides user data. In an optional substep (not shown) the host computer provides the user data by executing a host application. In step 1320, the host computer initiates a transmission carrying the user data to the UE. The transmission may pass via the base station, in accordance with the teachings of the embodiments described throughout this disclosure. In step 1330 (which may be optional), the UE receives the user data carried in the transmission.

Figure 14:
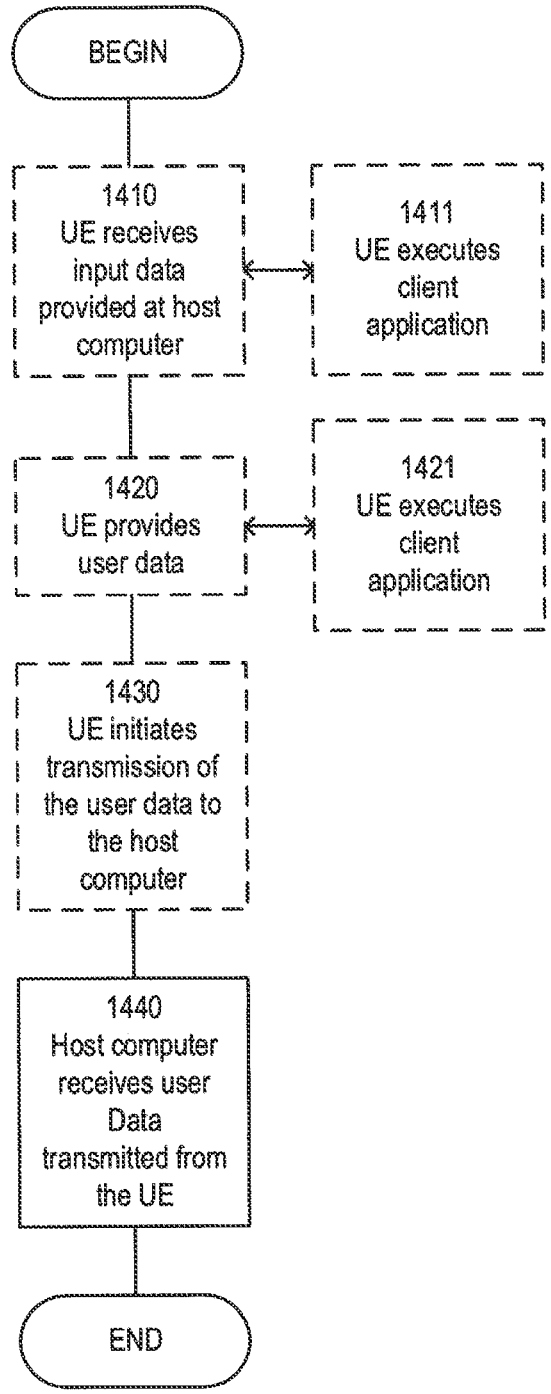
FIG. 14 is a flowchart showing methods implemented in a communication system including a host computer, a base station and a user equipment in accordance with some embodiments.

FIG. 14 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 14 will be included in this section. In step 1410 (which may be optional), the UE receives input data provided by the host computer. Additionally or alternatively, in step 1420, the UE provides user data. In substep 1421 (which may be optional) of step 1420, the UE provides the user data by executing a client application. In substep 1411 (which may be optional) of step 1410, the UE executes a client application which provides the user data in reaction to the received input data provided by the host computer. In providing the user data, the executed client application may further consider user input received from the user. Regardless of the specific manner in which the user data was provided, the UE initiates, in substep 1430 (which may be optional), transmission of the user data to the host computer. In step 1440 of the method, the host computer receives the user data transmitted from the UE, in accordance with the teachings of the embodiments described throughout this disclosure.

Figure 15:
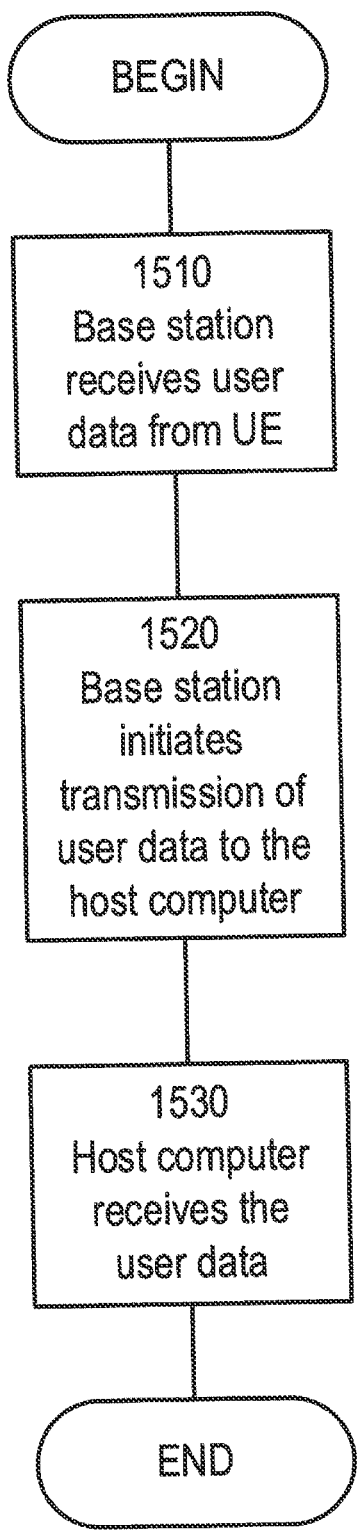
FIG. 15 is a flowchart showing methods implemented in a communication system including a host computer, a base station and a user equipment in accordance with some embodiments.

FIG. 15 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 15 will be included in this section. In step 1510 (which may be optional), in accordance with the teachings of the embodiments described throughout this disclosure, the base station receives user data from the UE. In step 1520 (which may be optional), the base station initiates transmission of the received user data to the host computer. In step 1530 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

1xRTT CDMA2000 1x Radio Transmission Technology
3GPP 3rd Generation Partnership Project
5G 5th Generation
ABS Almost Blank Subframe ARQ Automatic Repeat Request
AWGN Additive White Gaussian Noise
BCCH Broadcast Control Channel
BCH Broadcast Channel
CA Carrier Aggregation
CC Carrier Component
CCCH SDUCommon Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDCP Packet Data Convergence Protocol
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLC Radio Link Control
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDAP Service Data Adaptation Protocol
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method at a UE for a conditional mobility procedure, the method comprising:
receiving a conditional mobility configuration from a source network node containing at least an execution condition for conditional mobility based on beam measurement information;
performing beam measurements for at least one beam of at least one cell to obtain beam measurement information for the at least one beam, wherein the beam measurement information comprises a plurality of beams that each satisfy the execution condition and wherein the plurality of beams comprise beams of a plurality of potential target cells; and where beams of the plurality of potential target cells satisfy the execution condition, selecting one of the plurality of potential target cells as a preferred cell for the conditional mobility procedure, wherein the selecting of one of the plurality of potential target cells comprises ranking the plurality of potential target cells that satisfy the execution condition using the beam measurement information.

2. The method of claim 1, wherein the beam measurements comprise a reference signal received power, and/or reference signal received quality, and/or signal to noise ratio for a single-sideband modulation, SSB, and/or channel state information-reference signal, CSI-RS.

3. The method of claim 1, wherein the beam measurement information comprises a SSB index, and/or a CSI-RS index, and/or a further reference signal index.

4. The method of claim 1, wherein the plurality of beams comprise beams of a serving cell.

5. The method of claim 1, wherein the execution condition is any combination of one or more of:
a number of SSBs whose reference signal received power, RSRP, is above a threshold X1;
a number of SSBs whose reference signal received quality, RSRQ, is above a threshold X2;
a number of SSBs whose signal-to-interference plus noise ratio, SINR, is above a threshold X3;
a number of CSI-RSs whose RSRP is above a threshold Y1;
a number of CSI-RS whose RSRQ is above a threshold Y2; and
a number of CSI-RSs whose SINR is above a threshold Y3.

6. The method of claim 1, wherein the highest ranked cell of the plurality of potential target cells having a beam that satisfies the execution condition is the preferred cell in the event that the execution condition is satisfied by multiple potential target cells.

7. The method of claim 6, wherein a measurementRange parameter is used in the ranking, and the cells from among the plurality of potential target cells which may be selected as the highest ranked cell are the cells having a cell level measurement quantity within measurementRange of the highest cell level measurement quantity of a cell from among the plurality of cells, and wherein
the cell level measurement quantity is cell RSRP, cell RSRQ or cell SINR, and
the cell level measurement quantity is fixed, or the cell level measurement quantity is configurable.

8. The method of claim 1, wherein ranking the plurality of potential target cells uses the number of beams of a potential target cell having a measurement quantity that is above a configurable threshold, and the highest ranked potential target cell is the cell having the largest number of beams having the measurement quantity above the configurable threshold.

9. The method of claim 1, wherein ranking the plurality of potential target cells is based on at least one of RSRP, RSRQ and SINR measurements for the plurality of potential target cells, wherein if one or more of RSRP, RSRQ and SINR measurements are available for the plurality of potential target cells, the sorting rule sorts the potential target cells:

according to RSRP if available; else
according to RSRQ if available, else
according to SINR.

10. The method of claim 1, further comprising:
performing the conditional mobility for the selected potential target cell.

11. The method of claim 10, wherein the execution condition comprises:
that a number of good beams in a serving cell goes below a threshold and number of good beams in the potential target cell goes above a threshold, or
that a cell quality of the potential target cell is at least a configured offset better than the cell quality of the serving cell.

12. The method of claim 10, wherein the execution condition comprises that the potential target cell has a certain number of beams each having a quality above a configured quality threshold.

13. The method of claim 10, wherein the execution condition comprises that a quality of a best beam of the potential target cell exceeds a first threshold, and that a quality of a second beam of the potential target cell exceeds a second threshold.

14. The method of claim 10, wherein the execution condition comprises that a quality of a best beam of the potential target cell is at least a first offset better than a quality of a best beam of a serving cell, and a quality of a second best beam of the potential target cell is at least a second offset better than a quality of a second best beam of the service cell.

15. The method of claim 10, wherein the execution condition comprises that:
a quality of at least one beam of the potential target cell is at least a first offset better than a quality of a best beam of a serving cell; or
qualities of each of at least N1 beams of the potential target cell are at least a second offset better than a quality of a second best beam of the serving cell; or
qualities of each of at least Nn beams of the potential target cell are at least an nth offset better than a quality of a nth best beam of the serving cell.

16. A method at a UE for a conditional handover procedure, the method comprising:
receiving a conditional handover configuration from a source network node containing at least an execution condition for conditional handover based on beam measurement information;
performing beam measurements for at least one beam of each of a plurality of cells to obtain beam measurement information for beams, wherein the beam measurement information comprises a plurality of beams that satisfy the execution condition and wherein the plurality of beams comprise beams of a plurality of potential target cells; and
where beams of the plurality of potential target cells satisfy the execution condition, selecting one of the plurality of potential target cells as a preferred cell for the conditional mobility procedure, wherein the selecting of one of the plurality of potential target cells comprises ranking the plurality of potential target cells that satisfy the execution condition using the beam measurement information.

17. A wireless device for a conditional mobility procedure, the wireless device comprising:
processing circuitry configured to: receive a conditional mobility configuration from a source network node containing at least an execution condition for conditional mobility based on beam measurement information; perform beam measurements for at least one beam of at least one cell to obtain beam measurement information for the at least one beam, wherein the beam measurement information comprises a plurality of beams that each satisfy the execution condition and wherein the plurality of beams comprise beams of a plurality of potential target cells; and, where beams of the plurality of potential target cells satisfy the execution condition, select one of the plurality of potential target cells as a preferred cell for the conditional mobility procedure, wherein the selecting of one of the plurality of potential target cells comprises ranking the plurality of potential target cells that satisfy the execution condition using the beam measurement information, and power supply circuitry configured to supply power to the wireless device.

18. The wireless device of claim 17, wherein the beam measurements comprise a reference signal received power, and/or reference signal received quality, and/or signal to noise ratio for a single-sideband modulation, SSB, and/or channel state information-reference signal, CSI-RS.

19. The wireless device of claim 17, wherein the beam measurement information comprises a SSB index, and/or a CSI-RS index, and/or a further reference signal index.

20. The wireless device of claim 17, wherein the plurality of beams comprise beams of a serving cell.

21. The wireless device of claim 17, wherein the execution condition is any combination of one or more of:
   a number of SSBs whose reference signal received power, RSRP, is above a threshold X1;
   a number of SSBs whose reference signal received quality, RSRQ, is above a threshold X2;
   a number of SSBs whose signal-to-interference plus noise ratio, SINR, is above a threshold X3;
   a number of CSI-RSs whose RSRP is above a threshold Y1;
   a number of CSI-RS whose RSRQ is above a threshold Y2; and
   a number of CSI-RSs whose SINR is above a threshold Y3.

22. The wireless device of claim 17, wherein the highest ranked cell of the plurality of potential target cells having a beam that satisfies the execution condition is the preferred cell in the event that the execution condition is satisfied by multiple potential target cells.

23. The wireless device of claim 22, wherein a measurementRange parameter is used in the ranking, and the cells from among the plurality of potential target cells which may be selected as the highest ranked cell are the cells having a cell level measurement quantity within measurementRange of the highest cell level measurement quantity of a cell from among the plurality of cells, and wherein
   the cell level measurement quantity is cell RSRP, cell RSRQ or cell SINR, and
   the cell level measurement quantity is fixed, or the cell level measurement quantity is configurable.

24. The wireless device of claim 17, wherein ranking the plurality of potential target cells uses the number of beams of a potential target cell having a measurement quantity that is above a configurable threshold, and the highest ranked potential target cell is the cell having the largest number of beams having the measurement quantity above the configurable threshold.

25. The wireless device of claim 17, wherein ranking the plurality of potential target cells is based on at least one of RSRP, RSRQ and SINR measurements for the plurality of potential target cells, wherein if one or more of RSRP, RSRQ and SINR measurements are available for the plurality of potential target cells, the sorting rule sorts the potential target cells:
   according to RSRP if available; else
   according to RSRQ if available, else
   according to SINR.

26. The wireless device of claim 17, wherein the processing circuitry is further configured to:
   perform the conditional mobility for the selected potential target cell.

27. The wireless device of claim 26, wherein the execution condition comprises:
   that a number of good beams in a serving cell goes below a threshold and number of good beams in the potential target cell goes above a threshold, or
   that a cell quality of the potential target cell is at least a configured offset better than the cell quality of the serving cell.

28. The wireless device of claim 26, wherein the execution condition comprises that the potential target cell has a certain number of beams each having a quality above a configured quality threshold.

29. The wireless device of claim 26, wherein the execution condition comprises that a quality of a best beam of the potential target cell exceeds a first threshold, and that a quality of a second beam of the potential target cell exceeds a second threshold.

30. The wireless device of claim 26, wherein the execution condition comprises that a quality of a best beam of the potential target cell is at least a first offset better than a quality of a best beam of a serving cell, and a quality of a second best beam of the potential target cell is at least a second offset better than a quality of a second best beam of the service cell.

31. The wireless device of claim 26, wherein the execution condition comprises that:
   a quality of at least one beam of the potential target cell is at least a first offset better than a quality of a best beam of a serving cell; or
   qualities of each of at least N1 beams of the potential target cell are at least a second offset better than a quality of a second best beam of the serving cell; or
   qualities of each of at least Nn beams of the potential target cell are at least an nth offset better than a quality of a nth best beam of the serving cell.

32. A wireless device for a conditional handover procedure, the wireless device comprising:
   processing circuitry configured to: receive a conditional handover configuration from a source network node containing at least an execution condition for conditional handover based on beam measurement information; perform beam measurements for at least one beam of each of a plurality of cells to obtain beam measurement information for beams, wherein the beam measurement information comprises a plurality of beams that satisfy the exaction condition and wherein the plurality of beams comprise beams of a plurality of potential target cells; and, where beams of the plurality of potential target cells satisfy the execution condition, select one of the plurality of potential target cells as a preferred cell for the conditional mobility procedure, wherein the selecting of one of the plurality of potential target cells comprises ranking the plurality of potential target cells that satisfy the execution condition using the beam measurement information, and power supply circuitry configured to supply power to the wireless device.

33. A network node for facilitating a conditional mobility procedure, the network node comprising:
processing circuitry configured to: define a conditional mobility configuration containing at least an execution condition for conditional mobility based on beam measurement information; and initiate the transmission of the conditional mobility configuration to at least one user equipment, wherein the execution condition is based on beam measurements for a plurality of beams and the execution condition comprises a ranking criteria; and
power supply circuitry configured to supply power to the network node.

* * * * *